(12) United States Patent
Farnia et al.

(10) Patent No.: US 11,883,787 B2
(45) Date of Patent: Jan. 30, 2024

(54) ULTRAFILTRATION/NANOFILTRATION MEMBRANE WITH TUNABLE PORE SIZE

(71) Applicant: SOCIETE DE COMMERCIALISATION DES PRODUITS DE LA RECHERCHE APPLIQUÉE SOCPRA SCIENCEET GENIE S.E.C., Sherbrooke (CA)

(72) Inventors: Farhad Farnia, Sherbrooke (CA); Yue Zhao, Sherbrooke (CA)

(73) Assignee: SOCIETE DE COMMERCIALISATION DES PRODUITS DE LA RECHERCHE APPLIQUÉE SOCPRA SCIENCES ET GÉNIE S.E.C.

( * ) Notice: Subject to any disclaimer, the term of this patent is extended or adjusted under 35 U.S.C. 154(b) by 416 days.

(21) Appl. No.: 17/309,548

(22) PCT Filed: Dec. 12, 2019

(86) PCT No.: PCT/CA2019/051796
§ 371 (c)(1),
(2) Date: Jun. 4, 2021

(87) PCT Pub. No.: WO2020/118438
PCT Pub. Date: Jun. 18, 2020

(65) Prior Publication Data
US 2022/0023805 A1    Jan. 27, 2022

Related U.S. Application Data

(60) Provisional application No. 62/779,120, filed on Dec. 13, 2018.

(51) Int. Cl.
*B01D 71/78* (2006.01)
*B01D 61/02* (2006.01)
(Continued)

(52) U.S. Cl.
CPC .......... *B01D 71/78* (2013.01); *B01D 61/027* (2013.01); *B01D 61/145* (2013.01); *B01D 65/02* (2013.01);
(Continued)

(58) Field of Classification Search
None
See application file for complete search history.

(56) References Cited

FOREIGN PATENT DOCUMENTS

| WO | 2016149815 A1 | 9/2016 |
|---|---|---|
| WO | 2018038683 A1 | 3/2018 |

OTHER PUBLICATIONS

Arredondo et al., "Synthesis of CO2-responsive cellulose nanocrystals by surface-initiated Cu(0)-mediated polymerisation", Green Chemistry, 2017, vol. 19, pp. 4141-4152.

(Continued)

*Primary Examiner* — Chester T Barry
(74) *Attorney, Agent, or Firm* — LAVERY, DE BILLY, LLP; Isabelle Pelletier

(57) ABSTRACT

An ultrafiltration/nanofiltration membrane with gas-tunable pore size is provided. This membrane comprises an active layer arranged between two porous support layers, wherein the active layer is formed of randomly arranged cellulose nanocrystals, wherein pores are defined in the active layer by the free spaces existing between the randomly arranged cellulose nanocrystals, and wherein chains of a $CO_2$-responsive polymer are grafted on the surface of the cellulose nanocrystals. There are also provided methods for filtering a feed using the membrane, for tuning the apparent pore size/MWCO/charge of the membrane, for cleaning the membrane, and for manufacturing the membrane.

19 Claims, 24 Drawing Sheets

(51) Int. Cl.
| | |
|---|---|
| B01D 61/14 | (2006.01) |
| B01D 65/02 | (2006.01) |
| B01D 67/00 | (2006.01) |
| B01D 69/02 | (2006.01) |
| B01D 69/12 | (2006.01) |
| B01D 71/10 | (2006.01) |
| B01D 71/40 | (2006.01) |

(52) U.S. Cl.
CPC ......... *B01D 67/0006* (2013.01); *B01D 69/02* (2013.01); *B01D 69/12* (2013.01); *B01D 71/10* (2013.01); *B01D 71/40* (2013.01); *B01D 2321/18* (2013.01); *B01D 2323/02* (2013.01); *B01D 2323/283* (2013.01); *B01D 2323/36* (2013.01); *B01D 2323/38* (2013.01); *B01D 2325/02* (2013.01); *B01D 2325/14* (2013.01); *B01D 2325/16* (2013.01)

(56) References Cited

OTHER PUBLICATIONS

Bernardinelli et al., "Quantitative 13C MultiCP Solid-State NMR as a Tool for Evaluation of Cellulose Crystallinity Index Measured Directly inside Sugarcane Biomass", Biotechnology for Biofuels, 2015, vol. 8, No. 1, pp. 1-11.

Carpenter et al., "Cellulose Nanomaterials in Water Treatment Technologies", Environmental Science & Technology, 2015, vol. 49 (9), pp. 5277-5287.

Cheng et al. "Facile Fabrication of Superhydrophilic Membranes Consisted of Fibrous Tunicate Cellulose Nanocrystals for Highly Efficient Oil/Water Separation", Journal of Membrane Science, 2017, vol. 525, pp. 1-8.

Dong et al., "$CO_2$-Responsive Polymer Membranes with Gas-Tunable Pore Size", Chem. Commun., 2017, 53 (69), pp. 9574-9577.

Fielding et al., "Synthesis of PH-Responsive Tertiary Amine Methacrylate Polymer Brushes and Their Response to Acidic Vapour", Journal of Materials Chemistry, 2011, vol. 21 (32), pp. 11773-11780.

Garcia-Valdez et al., "Grafting $CO_2$-responsive polymers from cellulose nanocrystals vianitroxide-mediated polymerisation", Polymer Chemistry, 2017, vol. 8, pp. 4124-4131.

Glasing et al., "Graft-modified cellulose nanocrystals as $CO_2$-switchable Pickering emulsifiers", Polymer Chemistry, 2018, vol. 9, No. 28, pp. 3864-3872.

Glasing et al., "Grafting well-defined $CO_2$-responsive polymers to cellulose nanocrystals via nitroxide-mediated polymerisation: effect of graft density and molecular weight on dispersion behaviour", Polymer Chemistry, 2017, vol. 8, pp. 6000-6012.

Guo et al., "A Novel Smart Polymer Responsive to $CO_2$", Chem. Commun., 2011, vol. 47. Np. 33, pp. 9348-9350.

Habibi et al., "Cellulose Nanocrystals: Chemistry, Self-Assembly, and Applications", Chemical Reviews, 2010, vol. 110, No. 6, pp. 3479-3500.

Han et al., "General Strategy for Making $CO_2$-Switchable Polymers", ACS Macro Letters, 2012, vol. 1, No. 1, pp. 57-61.

He et al., "Diffusion and Filtration Properties of Self-Assembled Gold Nanocrystal Membranes", Nano Letters, 2011, vol. 11, No. 6, pp. 2430-2435.

Hilal et al., "Characterization and Retention of NF Membranes Using PEG, HS and Polyelectrolytes", Desalination, 2008, vol. 221, No. 1, pp. 284-293.

Holt et al., "Fast Mass Transport Through Sub-2-Nanometer Carbon Nanotubes", Science (80). 2006, vol. 312 (5776), pp. 1034-1037.

Huang et al., "Ultrafast Viscous Water Flow through Nanostrand-Channelled Graphene Oxide Membranes", Nature Communications, 2013, vol. 4, p. 1-9.

Johnson et al. "Quantitative Solid-State 13C NMR with Signal Enhancement by Multiple Cross Polarization", Journal of Magnetic Resonance, 2014, vol. 239, pp. 44-49.

Li et al., "A Novel Ultrafiltration (UF) Membrane with Controllable Selectivity for Protein Separation", Journal of Membrane Science, 2013, vol. 427, pp. 155-167.

Liu et al., "$CO_2$-Responsive polymer materials", Polymer Chemistry, 2017, vol. 8, pp. 12-23.

Liu et al., "Stimuli-Responsive Smart Gating Membranes", Chemical Society Reviews, 2016, vol. 45. No. 3, pp. 460-475.

Merkel et al., "Ultrapermeable, Reverse-Selective Nanocomposite Membranes", Science, 2002, vol. 296 No. 5567, pp. 519-522.

Morandi et al., "Cellulose Nanocrystals Grafted with Polystyrene Chains through Surface-Initiated Atom Transfer Radical Polymerization (SI-ATRP)", Langmuir, 2009, vol. 25, No. 14, pp. 8280-8286.

Motornov et al., "Chemical Gating with Nanostructured Responsive Polymer Brushes: Mixed Brush versus Homopolymer Brush", ACS Nano, 2008, vol. 2, No. 1, pp. 41-52.

Park et al., Measuring the Crystallinity Index of Cellulose by Solid State 13C Nuclear Magnetic Resonance, Cellulose, 2009, vol. 16, No. 4, pp. 641-647.

Platt et al., "Retention of Pegs in Cross-Flow Ultrafiltration through Membranes", Desalination, 2002, vol. 149 No. 1, pp. 417-422.

Sui et al., "Synthesis of Cellulose-Graft-Poly(N,N-Dimethylamino-2-Ethyl Methacrylate) Copolymers via Homogeneous ATRP and Their Aggregates in Aqueous Media", Biomacromolecules, 2008, vol. 9, No. 10, pp. 2615-2620.

Wang et al., Cellulose nanocrystals with $CO_2$-switchable aggregation and redispersion properties, Cellulose, 2015, vol. 22, pp. 3105-3116.

Ye et al., "Scaling Laws between the Hydrodynamic Parameters and Molecular Weight of Linear Poly(2-Ethyl-2-Oxazoline)", RSC Advances, 2013, vol. 3, No. 35, pp. 15108-15113.

ULTRAFILTRATION/NANOFILTRATION MEMBRANE WITH TUNABLE PORE SIZE

CROSS-REFERENCE TO RELATED APPLICATIONS

This application is a National Entry Application of PCT application no PCT/CA2019/051796 filed on Dec. 12, 2019 and published in English under PCT Article 21(2), which itself claims benefit of U.S. provisional application Ser. No. 62/779,120, filed on Dec. 13, 2018. All documents above are incorporated herein in their entirety by reference.

FIELD OF THE INVENTION

The present invention relates to a membrane for ultrafiltration/nanofiltration. More specifically, the present invention is concerned with an ultrafiltration/nanofiltration membrane with gas-tunable pore size; a method of filtering a feed using the membrane, a method of tuning the pore size of the membrane; a method of cleaning the membrane; and a method of manufacturing the membrane.

BACKGROUND OF THE INVENTION

In recent years, much efforts have been devoted to the fabrication of highly efficient membrane for industrial filtration and separation processes. Various nanomaterials have been used to construct ultrafiltration (UF) membranes. The use of nanomaterials such as graphene and carbon nanotube in such membrane has been suggested. The unalterable pore size and surface characteristics of conventional porous membranes limit their efficient applications. Therefore, stimuli-responsive membranes are increasingly being developed. The channels of stimuli responsive membranes change their permeability and selectivity in response to chemical or physical environment signals such as temperature, pH, specific ions/molecules, light, magnetic fields and gases. The membrane gates act as a smart "door" by "opening" or "closing" in response to the environmental signals.

On another subject, natural cellulose is a hydrophilic semi-crystalline organic polymer. It is a polysaccharide that is produced naturally in the biosphere. It is the structural material of the cell wall of plants, many algae, and fungus-like oomycota. Cellulose is naturally organized into long linear chains of ether-linked poly(β-1,4-glucopyranose) units. These chains assemble by intra- and inter-molecular hydrogen bonds into highly crystalline domains—see FIG. 1. Regions of disordered (amorphous) cellulose exist between these crystalline domains in cellulose nanofibrils (CNF, typically 5 to 30 nm in width and >1 μm in length). These cellulose nanofibrils assemble into cellulose fibrils and eventually into cellulose fibers. Each nanofibril contains crystalline cellulose domains separated amorphous cellulose domains. These crystalline cellulose domains can be liberated by removing the amorphous cellulose domains, which yields cellulose nanocrystals (CNC, typically 2 to 20 nm in width and >100 to 600 μm in length). Cellulose nanocrystals (CNC) are also referred to as crystalline nanocellulose (CNC) and nanocrystalline cellulose (NCC). As shown in FIG. 1, cellulose nanocrystals exhibit an anisotropic, rod-like shape. Cellulose nanocrystals are a sustainable, biosourced nanomaterial that has been used in many applications, such as reinforcement agent for making nanocomposites, Pickering emulsifier and liquid crystalline material.

SUMMARY OF THE INVENTION

In accordance with the present invention, there is provided:

1. An ultrafiltration/nanofiltration membrane with gas-tunable pore size comprising an active layer arranged on a first porous support layer,
    wherein the active layer is formed of randomly arranged cellulose nanocrystals,
    wherein pores are defined in the active layer by the free spaces existing between the randomly arranged cellulose nanocrystals, and
    wherein chains of a $CO_2$-responsive polymer are grafted on the surface of the cellulose nanocrystals.
2. The membrane of item 1, wherein the cellulose nanocrystals are from about 2 nm to about 20 nm, preferably about 5 nm to about 10 nm in width and from about 100 to about 600 nm, preferably about 100 nm to about 200 nm in length.
3. The membrane of item 1 or 2, further comprising a second porous support layer, wherein the active layer is arranged between the first porous support layer and a second porous support layer
4. The membrane of any one of items 1 to 3, wherein the cellulose nanocrystals are covalently bonded to the first porous support layer.
5. The membrane of any one of items 1 to 4, wherein the cellulose nanocrystals are covalently bonded to each other.
6. The membrane of any one of items 1 to 5, wherein the first and/or second porous support layers are silver membranes, alumina oxide membranes, cellulose acetate membranes, mixed cellulose ester (MCE) membranes, nylon membranes, polyacrylonitrile (PAN) membranes, polyethersulfone (PES) membranes, polyester (PETE) hydrophilic membrane, polytetrafluoroethylene (PTFE) membranes, polyvinylidene fluoride (PVDF) hydrophilic membranes, glass fiber (GF) membranes, polycarbonate (PCTE) membranes, or a combination thereof.
7. The membrane of any one of items 1 to 6, wherein the first and/or second porous support layers are cellulose acetate membranes.
8. An ultrafiltration/nanofiltration membrane with gas-tunable pore size comprising an active layer, wherein the active layer is formed of a porous polyether sulfone (PES), cellulose acetate, Nylon, cellulose nitrate, or polytetrafluoroethylene (PTFE) membrane and wherein chains of $CO_2$-responsive polymer are grafted on the surface and the gates of the membrane.
9. The membrane of any one of items 1 to 8, wherein upon exposure of the membrane to $CO_2$, the chains of the $CO_2$-responsive polymer either extend away from the surface of the cellulose nanocrystals, thereby decreasing the size of the pores in the active layer, or collapse on themselves close to the surface of the cellulose nanocrystals, thereby increasing the size of the pores in the active layer, and wherein exposure of the membrane to an inert gas reverses the changes caused by exposure to $CO_2$.
10. The membrane of item 9, wherein the $CO_2$ and/or the inert gas are dissolved in a feed to be filtered using the membrane.
11. The membrane of item 8 or 9, wherein the inert gas is nitrogen or argon, more preferably nitrogen.
12. The membrane of any one of items 1 to 11, wherein the $CO_2$-responsive polymer bears $CO_2$-sensitive functional groups which are organobase functional groups or weak-acid carboxyl functional groups.

13. The membrane of any one of items 1 to 12, having a hydrophilicity tunability with the hydrophilicity increasing upon exposure of the membrane to $CO_2$ and decreasing upon exposure of the membrane to the inert gas.

14. The membrane of any one of items 1 to 13, having a charge tunability between neutral and positive or between negative and neutral.

15. The membrane of any one of items 1 to 14, wherein the $CO_2$-responsive polymer bears organobase functional groups.

16. The membrane of any one of items 1 to 15, wherein the $CO_2$-responsive polymer bears amidine, amine and/or guanidine functional groups.

17. The membrane of any one of items 1 to 16, wherein the $CO_2$-sensitive polymer bears amine functional groups.

18. The membrane of any one of items 1 to 17, wherein the $CO_2$-responsive polymer and is:
   poly[(2-dimethylamino) ethyl methacrylate] (PDMAEMA),
   poly(2-(diethylamino)ethyl methacrylate) (PDEAEMA), or
   poly(3-N',N'-dimethylaminopropyl acrylamide) (PDMAPMA).

19. The membrane of any one of items 1 to 18, wherein the $CO_2$-sensitive polymer is poly((2-diethylamino) ethyl methacrylate) (PDEAEMA)

20. The membrane of any one of items 1 to 16 wherein the $CO_2$-responsive polymer bears amidine functional groups.

21. The membrane of any one of items 1 to 16 and 20, wherein the $CO_2$-responsive polymer is:
   poly(N-methyltetrahydropyrimidine) (PMTHP),
   poly(p-azidomethylstyrene-co-styrene),
   poly[2-methyl-1-(4-vinylbenzyl)-1,4,5,6-tetrahydropyrimidine],
   poly(dimethyl acrylamide-co-(N-amidino)ethyl acrylamide) (P(DMA-co-NAEAA)), or
   poly(ethylene oxide)-b-poly((N-amidino)dodecyl acrylamide).

22. The membrane of any one of items 1 to 16, wherein the $CO_2$-responsive polymer bears guanidine functional groups.

23. The membrane of any one of items 1 to 16 and 22, wherein the $CO_2$-responsive polymer is poly(L-arginine methyl ester acrylamide-co-N-cyclopropyl acrylamide) (poly(AME-co-CPAM).

24. The membrane of any one of items 1 to 23, having a charge tunability between neutral and positive.

25. The membrane of any one of items 1 to 24, wherein when the membrane is exposed to $CO_2$, the chains of the $CO_2$-responsive polymer extend away from the surface of the cellulose nanocrystals, thereby decreasing the size of the pores in the active layer, and
   when the membrane is exposed to an inert gas, the chains of the $CO_2$-responsive polymer collapse on themselves close to the surface of the cellulose nanocrystals, thereby increasing the size of the pores in the active layer 26. The membrane of any one of items 1 to 14, wherein the $CO_2$-responsive polymer bears weak-acid carboxyl functional groups.

27. The membrane of any one of items 1 to 14 and 26, wherein the $CO_2$-responsive polymer is polymethacrylic acid (PMAA).

28. The membrane of any one of items 1 to 14 and 26 to 27, having a hydrophilicity tunability with the hydrophilicity increasing upon exposure of the membrane to $CO_2$ and decreasing upon exposure of the membrane to the inert gas.

29. The membrane of any one of items 1 to 14 and 26 to 28, having a charge tunability between neutral and positive or between negative and increasingly neutral.

30. The membrane of any one of items 1 to 14 and 26 to 29, wherein when the membrane is exposed to $CO_2$, the chains of the $CO_2$-responsive polymer collapse on themselves close to the surface of the cellulose nanocrystals, thereby increasing the size of the pores in the active layer, and
   when the membrane is exposed to the inert gas, the chains of the $CO_2$-responsive polymer extend away from the surface of the cellulose nanocrystals, thereby decreasing the size of the pores in the active layer.

31. The membrane of any one of items 1 to 30, wherein about 2% to about 20%, preferably about 5% to about 15%, and more preferably about 11% of the glucose units in the cellulose nanocrystals bear a chain of the $CO_2$-responsive polymer.

32. The membrane of any one of items 1 to 31, wherein the active layer has a thickness between about 0.5 μm and about 15 μm, preferably between about 0.5 μm and about 10 μm, and more preferably between about 1 and about 6 μm.

33. The membrane of any one of items 1 to 32, wherein the chains of the $CO_2$-responsive polymer have a molecular weight between about 5,000 and about 25,000 Da, preferably between about 9,000 and about 18,000 Da, and more preferably about 14,500 Da.

34. The membrane of any one of items 1 to 33, having an apparent pore size between about 0.5 nm (for a thick active layer in closed gate configuration) and about 100 nm (for a thin active layer in open gate configuration), preferably between about 1 nm and about 50 nm, and more preferably between about 3 nm and about 10 nm.

35. The membrane of any one of items 1 to 34, having a molecular weight cut-off (MWCO) between about 1,000 Da to about 500,000 Da, preferably between about 2,000 Da and about 200,000 Da, and more preferably between about 20,000 Da and about 100,000 Da.

36. The membrane of any one of items 1 to 35, having a pore size tunability between about 10% and about 70%, preferably between about 20% and about 60%, and more preferably of about 50%.

37. The membrane of any one of items 1 to 36, having a MWCO tunability between about 20% and about 65%, preferably between about 40% and about 60%, and more preferably of about 50%.

38. The membrane of any one of items 1 to 37, having a flowrate tunability between about 2 and about 10, preferably of about 5.

39. A method of filtering a feed using the membrane of any one of items 1 to 38, the method comprising the step of contacting the feed with one side of the membrane and applying pressure to the feed so that materials to be separated from the feed pass through the membrane as a permeate.

40. The method of item 39, further comprising, the step of tuning the apparent pore size of the membrane by contacting the membrane with $CO_2$ or an inert gas.
41. The method of item 39 or 40, further comprising the step of tuning the MWCO of the membrane by contacting the membrane with $CO_2$ or an inert gas.
42. The method of any one of items 39 to 41, further comprising the step of tuning the charge of the membrane by contacting the membrane with $CO_2$ or an inert gas.
43. The method of item 42, wherein the step of tuning the charge of the membrane is a step of creating a positive charge on the membrane, creating a negative charge on the membrane, or neutralizing a positive or negative charge of the membrane.
44. The method of any one of items 39 to 43, further comprising the step of tuning the hydrophilicity of the membrane by contacting the membrane with $CO_2$ or an inert gas.
45. The method of item 44, wherein the step of hydrophilicity the charge of the membrane is a step of increasing hydrophilicity or decreasing hydrophilicity.
46. The method of any one of items 39 to 45, further comprising the step of tuning the flowrate through the membrane by contacting the membrane with $CO_2$ or an inert gas.
47. The method of any one of items 39 to 46, further comprising the step of cleaning the membrane.
48. The method of item 47, wherein the cleaning step comprises the step of contacting the membrane with $CO_2$ or an inert gas to:
    increase the apparent pore size of the membrane, preferably to a maximum pore size, and/or
    increase or decrease the hydrophilicity of the membrane, and/or
    dislodge matter clogging the membrane by extending the $CO_2$-responsive polymer chains away from the surface of the cellulose nanocrystals or collapse the $CO_2$-responsive polymer chains on themselves close to the surface of the cellulose nanocrystals.
49. The method of item 48, wherein the cleaning step further comprises the step of allowing the matter clogging the membrane to cross the membrane.
50. The method of item 49, wherein the cleaning step further comprises the step of increasing liquid flow across the membrane to ease passage of the matter clogging the membrane across the membrane.
51. The method of any one of item 47 to 50, wherein filtering of the feed continues during the cleaning step.
52. The method of any one of item 47 to 51, wherein the cleaning step is repeated at regular intervals during the filtering.
53. The method of item 48, wherein the cleaning step further comprises the steps of reversing the liquid flow across the membrane and allowing the matter clogging the membrane to flow back out of the membrane.
54. The method of any one of item 47 to 53, wherein the cleaning step is carried out in situ at the location where the membrane has been used to filter the feed or will eventually be used to filter a feed.
55. The method of any one of items 47 to 54, further comprising, after the cleaning step, the step of reusing the clean membrane to filter a feed.
56. A method of tuning the apparent pore size, the MWCO, the flowrate, the hydrophilicity, and/or the charge of the membrane of any one of items 1 to 38, the method comprising contacting the membrane with $CO_2$ or an inert gas.
57. The method of item 56, being carried out at the beginning of filtering or during filtering of a feed, preferably by dissolving the $CO_2$ or the inert gas in the feed.
58. A method of cleaning the membrane of any one of items 1 to 38 after the membrane has been used for filtering a feed or while the membrane is being used for filtering a feed, the method comprises the step of contacting the membrane with $CO_2$ or an inert gas to:
    increase the apparent pore size of the membrane, preferably to a maximum pore size, and/or
    increase or decrease the hydrophilicity of the membrane, and/or
    dislodge matter clogging the membrane by extending the $CO_2$-responsive polymer chains away from the surface of the cellulose nanocrystals or collapse the $CO_2$-responsive polymer chains on themselves close to the surface of the cellulose nanocrystals.
59. The method of item 58, further comprising the step of allowing the matter clogging the membrane to cross the membrane.
60. The method of item 59, further comprising the step of increasing liquid flow across the membrane to ease passage of the matter clogging the membrane across the membrane.
61. The method of any one of item 58 to 60, wherein filtering of the feed continues during the cleaning step.
62. The method of any one of item 58 to 61, wherein the contacting step is repeated at regular intervals during the filtering.
63. The method of item 58, further comprising the steps of reversing the liquid flow across the membrane and allowing the matter clogging the membrane to flow back out of the membrane.
64. The method of any one of items 39 to 63, wherein the $CO_2$ or the inert gas is dissolved in a solution or in a feed, preferably in the feed.
65. The method of any one of items 39 to 64, wherein the $CO_2$ or the inert gas is dissolved in the solution or a feed by bubbling the $CO_2$ or the inert gas in the solution or the feed.
66. A method of manufacturing the membrane of any one of items 1 to 7 and 9 to 35, the method comprising the steps of:
    a) providing cellulose nanocrystals with chains of the $CO_2$-responsive polymer grafted on the surface of the cellulose nanocrystals,
    b) forming said cellulose nanocrystals into an active layer by randomly arranging said cellulose nanocrystals on a first porous support layer, and
    c') depositing a second porous support layer on the active layer and securing the first and second porous support layers together, or
    c") covalently bonding the cellulose nanocrystals to the first porous support layer.
67. The method of item 66, wherein step a) comprises the step of attaching chains of the $CO_2$-responsive polymer to cellulose nanocrystals.
68. The method of item 66, wherein step a) comprises the step of growing chains of the $CO_2$-responsive polymer on the surface of the cellulose nanocrystals.
69. The method of item 68, the growing step comprises attaching a polymerization initiator on the surface of the cellulose nanocrystals, and using the cellulose nanocrystals for initiating a polymerization reaction of monomers of the $CO_2$-responsive polymer, thus growing said chains of the $CO_2$-responsive polymer on the surface of the cellulose nanocrystals.

70. The method of item 69, wherein the polymerization initiator is a halogen, a di- or tri-(thiocarbonyl), or an alkoxyamine N-hydroxysuccinimidyl, preferably a halogen, and more preferably Br.

71. The method of item 69 or 70, wherein the polymerization reaction is a "grafting from" method such as an atom transfer radical polymerization (ATRP), a Reversible Addition-Fragmentation chain Transfer (RAFT) polymerization, or a Nitroxide Mediated radical Polymerization (NMP), preferably an atom transfer radical polymerization (ATRP), or a "grafting to" method.

72. The method of any one of item 66 to 71, wherein step b) comprises filtering a suspension of said cellulose nanocrystals using the first porous support layer.

73. The method of any one of item 66 to 72, wherein step c") further comprises covalently bonding the cellulose nanocrystals to each other.

74. The method of any one of item 66 to 72, further comprising after step c"), the step of depositing a second porous support layer on the active layer and securing the first and second porous support layers together.

75. The method of any one of item 66 to 74, wherein the periphery of the first and second porous support layers is free of active layer and thus the first and second porous support layers are direct in contact with each other, and wherein the method further comprises the step of applying an adhesive at said periphery to secure the first and second porous support layers together.

76. The method of item 75, further comprising the step of applying pressure to the membrane after applying the adhesive.

77. The method of method of any one of item 66 to 76, further comprising the step of priming the membrane by contacting the membrane with $CO_2$ and then contacting the membrane with an inert gas.

BRIEF DESCRIPTION OF THE DRAWINGS

In the appended drawings:

FIG. 3 B) is a cross-sectional view of a membrane of the invention in the closed gate configuration (left) and in the open gate configuration (right) discriminating or not, respectively, molecules/particles of different size FIG. 3 C) is a scheme of the reaction of $CO_2$-sensitive functional groups carbonic acid generated by $CO_2$.

FIG. 3 D) is a schematic representation of the gas responsiveness of the polymers containing organobase functional groups grafted on the surface of the cellulose nanocrystals (CNC).

FIG. 9 B) is a SEM image of the cross-sections of membrane M2.

FIG. 9 C) is a SEM image of the cross-sections of membrane M3.

FIG. 14 B) shows the SEC spectra of a PEG 2,000 gr/mol and 20,000 gr/mol feed solution, the permeate obtained after filtration with membrane M3 treated with $CO_2$, and the permeate obtained after filtration with membrane M3 treated with $N_2$.

FIG. 14 C) shows the SEC spectra of a PEG 6,000 gr/mol and 20,000 gr/mol feed solution, the permeate obtained after filtration with membrane M3 treated with $CO_2$, and the permeate obtained after filtration with membrane M3 treated with $N_2$.

FIG. 15 B) shows the SEC spectra of a PEG 2,000 gr/mol and 20,000 gr/mol feed solution, the permeate obtained after filtration with membrane M2 treated with $CO_2$, and the permeate obtained after filtration with membrane M3 treated with $N_2$.

FIG. 15 C) shows the SEC spectra of a PEG 6,000 gr/mol and 20,000 gr/mol feed solution, the permeate obtained after filtration with membrane M2 treated with $CO_2$, and the permeate obtained after filtration with membrane M3 treated with $N_2$.

FIG. 16 B) shows the SEC spectra of a PEG 2,000 gr/mol and 20,000 gr/mol feed solution, the permeate obtained after filtration with membrane M1 treated with $CO_2$, and the permeate obtained after filtration with membrane M3 treated with $N_2$.

FIG. 16 C) shows the SEC spectra of a PEG 6,000 gr/mol and 20,000 gr/mol feed solution, the permeate obtained after filtration with membrane M1 treated with $CO_2$, and the permeate obtained after filtration with membrane M3 treated with $N_2$.

FIG. 20 B) shows UV-Vis absorption spectra of the feed for BSA filtration, the permeate after filtration M2 with bubbling $CO_2$, and the permeate after filtration M2 with $N_2$.

FIG. 20 C) shows UV-Vis absorption spectra of the feed for BSA filtration, the permeate after filtration M3 with bubbling $CO_2$, and the permeate after filtration M3 with $N_2$.

FIG. 23 B) shows UV-Vis absorption spectra of the feed for Rhodamine B filtration, the permeate after filtration M2 with bubbling $CO_2$, and the permeate after filtration M1 with $N_2$.

FIG. 23 C) shows UV-Vis absorption spectra of the feed for Rhodamine B filtration, the permeate after filtration M3 with bubbling $CO_2$, and the permeate after filtration M1 with $N_2$.

DETAILED DESCRIPTION OF THE INVENTION

Ultrafiltration/Nanofiltration Membrane

Turning now to the invention in more details, there is provided an ultrafiltration/nanofiltration membrane with gas-tunable pore size. This membrane comprises an active layer arranged on a first porous support layer,
wherein the active layer is formed of randomly arranged cellulose nanocrystals,
wherein pores are defined in the active layer by the free spaces existing between the randomly arranged cellulose nanocrystals, and
wherein chains of $CO_2$-responsive polymer are grafted on the surface of the cellulose nanocrystals.

In an alternative aspect of the invention, there is provided an ultrafiltration/nanofiltration membrane with gas-tunable pore size as above. This membrane comprises an active layer formed of a porous polyether sulfone (PES), cellulose acetate, Nylon, cellulose nitrate, or polytetrafluoroethylene (PTFE) membrane and wherein chains of $CO_2$-responsive polymer are grafted on the surface and the gates of the membrane.

Figure 1:
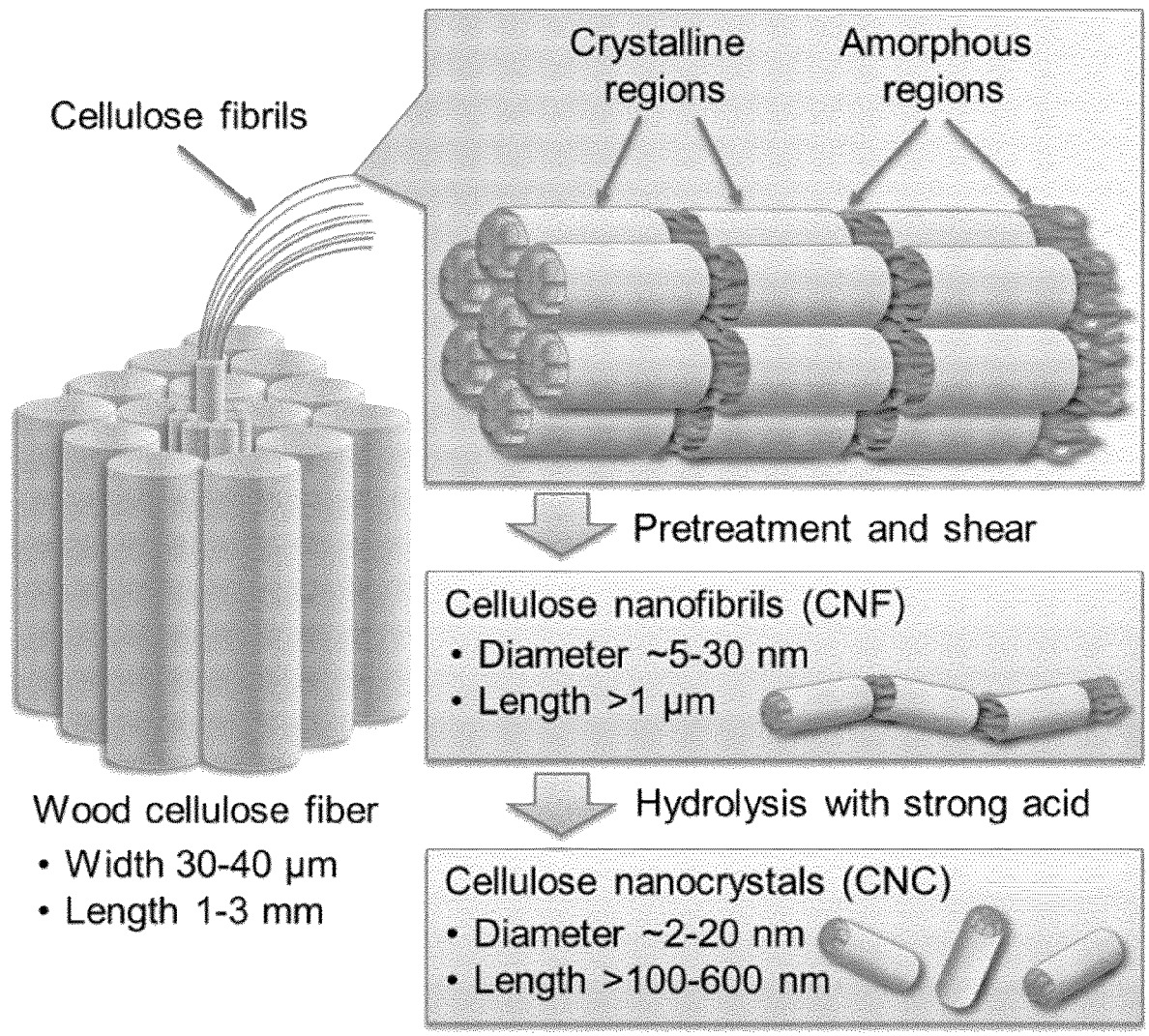
FIG. 1 is a schematic representation of cellulose fibers, fibrils, nanofibrils (CNF), and nanocrystals (CNC).
Figure 2:
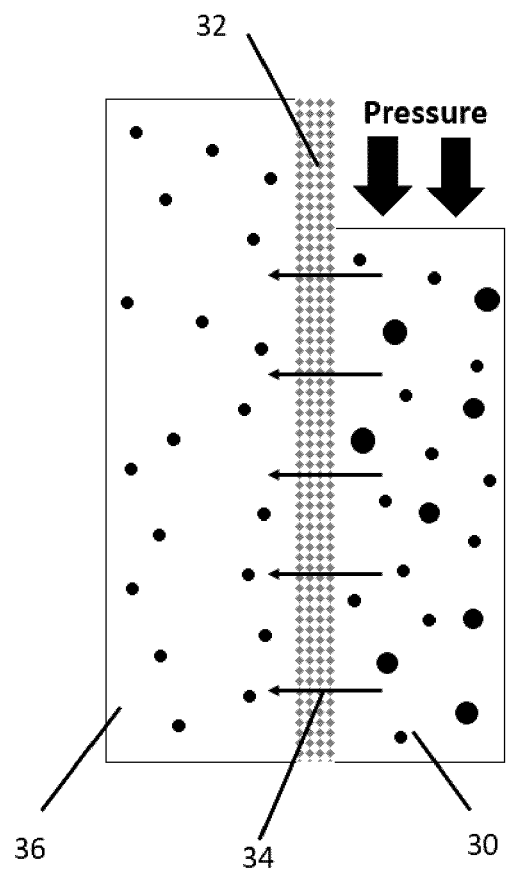
FIG. 2 is a schematic representation of the ultrafiltration/nanofiltration process.

Ultrafiltration (UF) and nanofiltration (NF) are both size exclusion-based filtration technologies. Typically, UF and NF are carried out as shown in FIG. 2. Pressure is applied to a feed (30) that is in contact with a UF or NF membrane (32). The membrane only allows through solutes that are below a certain size (34). As a result, a permeate (36) containing these solutes is formed on the side of the UF or NF membrane opposite the feed. UF and NF membranes are porous semipermeable membranes that allow particles/molecules below a certain size to flow through, while trapping larger particles/molecules. The degree of separation achieved with these membranes largely depends on the solute size compared to the size of the pores on the membrane. The Molecular Weight Cut-Off (MWCO) of the membrane, which is defined in the art to the lowest molecular weight solute (in Daltons) for which 90% of the solute is retained by the membrane, thus also depends on the size of the pores on the membrane.

The membrane of the invention is a porous semipermeable membrane for ultrafiltration/nanofiltration. It is characterized by the use of randomly arranged cellulose nanocrystals as the active layer. As noted above, cellulose nanocrystals exhibit an anisotropic, rod-like shape. They typically are from about 2 nm to about 20 nm, preferably about 5 nm to about 10 nm, in width and from about 100 to about 600 nm, preferably about 100 nm to about 200 nm, in length. In the active layer of the membrane of the invention, the nanocrystals are randomly arranged. In other words, they are heaped together without order; piled up haphazardly. As a result, free spaces exist between the randomly arranged cellulose nanocrystals. These free spaces define pores in the active layer. It is through these pores that the solute(s) must pass to cross the membrane. In other words, the size exclusion-based separation achieved, and the molecular weight cut-off of the membrane, both depend on the size of these pores in the active layer.

The membrane of the invention is further characterized by the fact that the size of the free spaces existing between the randomly arranged cellulose nanocrystals (i.e. the size of the pores) in the active layer is gas-tunable or, in other words, can be tuned using gases. This pore size tuning is made possible by the chains of the $CO_2$-responsive polymer grafted on the surface of the cellulose nanocrystals. Indeed, upon exposure of the membrane to $CO_2$, the $CO_2$-responsive polymer chains either extend away from the surface of the cellulose nanocrystals, thereby decreasing the size of the pores in the active layer, or collapse on themselves close to the surface of the cellulose nanocrystals, thereby increasing the size of the pores in the active layer. Furthermore, exposure of the membrane to an inert gas reverses the changes caused by exposure to $CO_2$.

Figure 3:
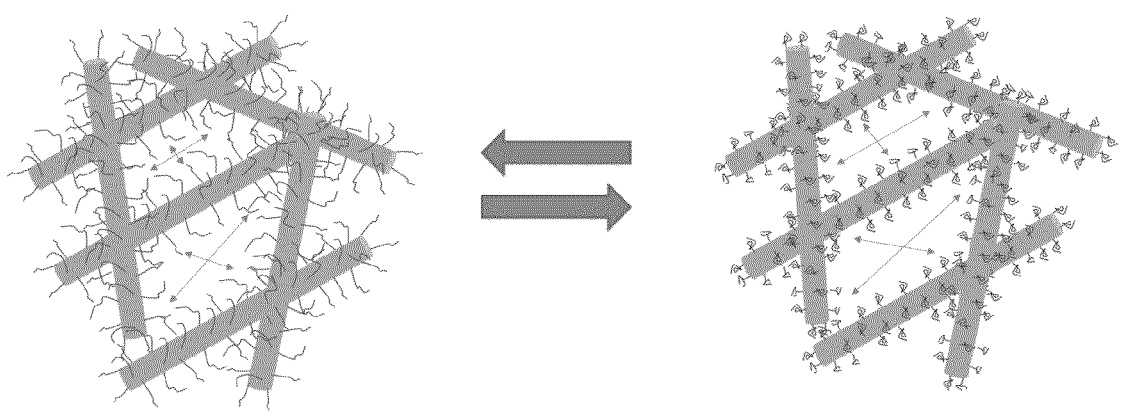
FIG. 3 A) is a top view of a membrane of the invention in the closed gate configuration (left) and in the open gate configuration (right).
Figure 3:
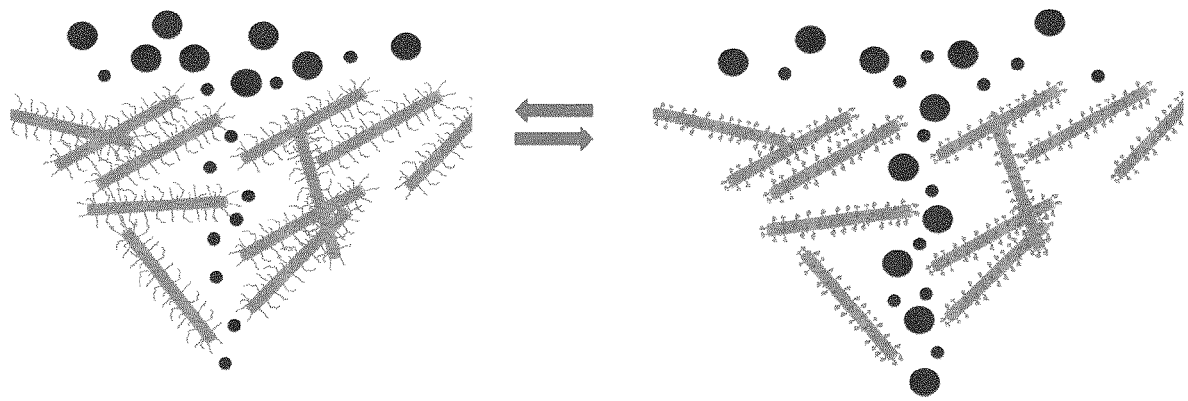
Figure 3:
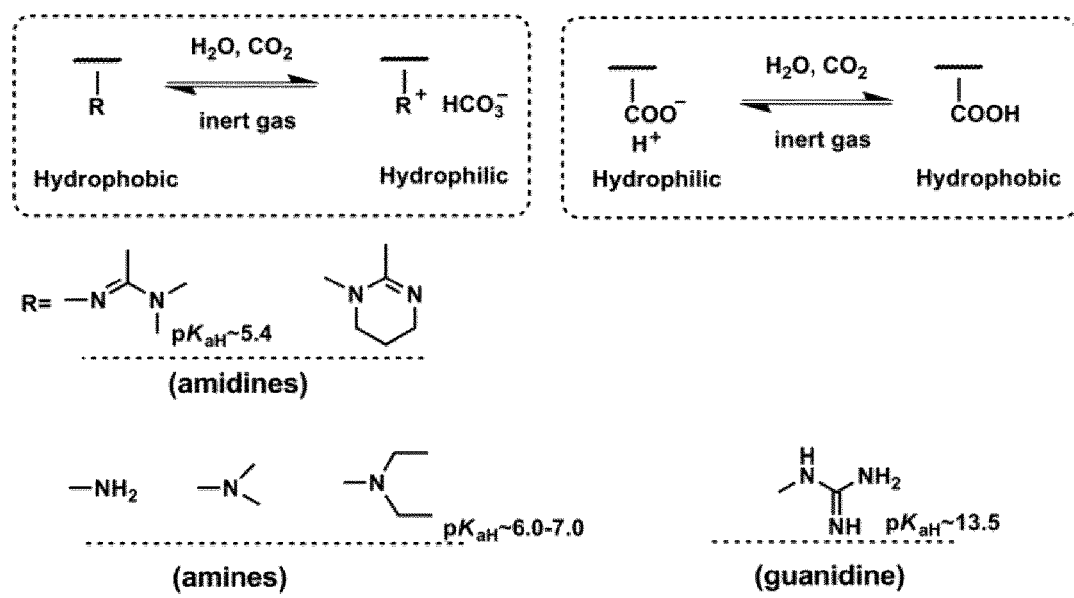
Figure 3:
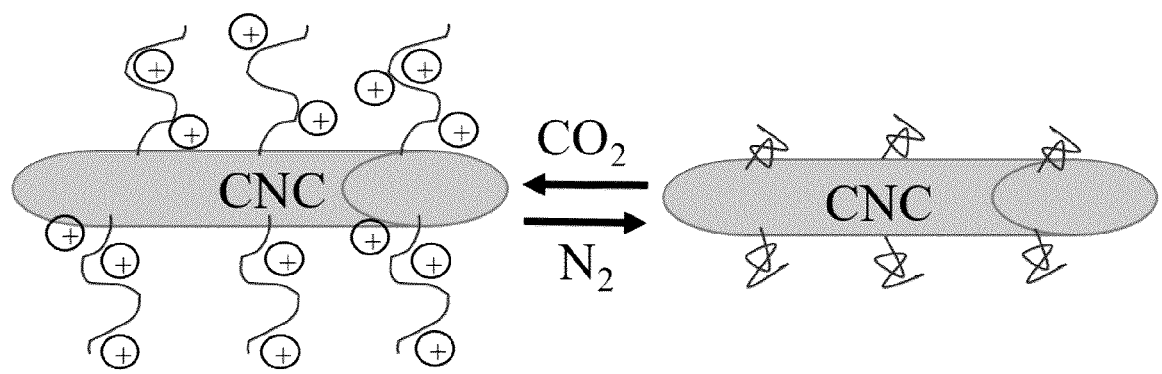

This reversible effect is shown in FIGS. 3A) and B). The pores become larger as the $CO_2$-responsive polymer chains collapse on themselves close to the surface of the cellulose nanocrystals and reach their maximum size when the polymer chains are fully collapsed. When the pores reach their maximum size, the molecular weight cut-off is also at its maximum, and the active layer is said to be in a "open gate configuration". Conversely, the pores become smaller as the $CO_2$-responsive polymer chains extend away from the surface of the cellulose nanocrystals and reach their minimum size when the polymer chains are fully extended. When the pores reach their minimum size, the molecular weight cut-off is also at its minimum, and the active layer is said to be in a "close gate configuration".

Thus, the pore size in the active layer can be tuned between the maximum pore size of the open gate configuration and the minimum pore size of the close gate configuration and this tuning is effected by means of exposition to gases, preferably these gases are dissolved in the feed to be filtered using the membrane.

It will also be apparent to the skilled person that this gas-tunable pore size also allows a user to tune the flowrate through the membrane during filtration. Indeed, smaller pores result in lower flow rates. Herein, the "flowrate" of the membrane is the flowrate of a liquid, such as water, through the membrane at a given pressure. This parameter is intended to be used as a comparator between different membrane of the invention and between a single membrane in different states (e.g. open and closed gate configurations). It is not intended to limit the use of the membrane to instances where such a liquid (e.g. water) is to be or is actually being filtered.

In embodiments, the cellulose nanocrystals are covalently bonded (e.g. crosslinked) to the first porous support layer. In preferred embodiments are covalently bonded (e.g. crosslinked) to each other and to the first porous support layer.

The $CO_2$-responsive polymer is any $CO_2$-responsive polymer known to the skilled person. In embodiments, the $CO_2$-responsive polymer bears $CO_2$-sensitive functional groups such as organobase functional groups, preferably amidines, amines and guanidines, or weak-acid carboxyl functional groups, all of which can react with the carbonic acid generated by $CO_2$ in the presence of water or wet organic solvents.

Herein, a "weak acid" is any acid with a $pK_a$ value which or more than −2.

Non-limiting examples of $CO_2$-responsive polymer bearing amidine functional groups include:
poly(N-methyltetrahydropyrimidine) (PMTHP),
poly(p-azidomethylstyrene-co-styrene),
poly[2-methyl-1-(4-vinylbenzyl)-1,4,5,6-tetrahydropyrimidine],
poly(dimethyl acrylamide-co-(N-amidino)ethyl acrylamide) (P(DMA-co-NAEAA)), and
poly(ethylene oxide)-b-poly((N-amidino)dodecyl acrylamide).

Non-limiting examples of $CO_2$-responsive polymer bearing amine functional groups include:
poly[(2-dimethylamino) ethyl methacrylate] (PDMAEMA),
poly(2-(diethylamino)ethyl methacrylate) (PDEAEMA), and
poly(3-N',N'-dimethylaminopropyl acrylamide) (PDMAPMA).

Non-limiting examples of $CO_2$-responsive polymer bearing guanidine functional groups include Poly(L-arginine methyl ester acrylamide-co-N-cyclopropyl acrylamide) (poly(AME-co-CPAM).

Non-limiting examples of $CO_2$-responsive polymer bearing weak-acid carboxyl functional groups include polymethacrylic acid (PMAA).

The scheme presented in FIG. 3C summarizes the reactions of the organobases with $CO_2$. In short, when dissolved in water (or wet organic solvents) $CO_2$ forms carbonic acid: $CO_2+H_2O \leftrightarrow H_2CO_3$. This acid protonates the amidine, amine, and/or guanidine (i.e. basic) functional groups of the $CO_2$-responsive polymer creating positive charges on the polymer chain. These charges render the polymer more hydrophilic, which allows the chains of the $CO_2$-responsive polymer to extend away from the surface of the cellulose nanocrystals as shown in FIG. 3D (thus decreasing pore size). Exposition of the membrane to the inert gas reverses this reaction (i.e. deprotonates) and yields the neutral form of the polymer, which is less hydrophilic and thus collapses on itself on the surface of the cellulose nanocrystals (thus increasing pore size).

On the other hand, the carbonic acid formed by $CO_2$ protonates the weak-acid carboxyl functional groups of the $CO_2$-responsive polymer neutralizing the negative charge on the polymer chain. Thus, the polymer becomes less hydrophilic, which causes the chains of the $CO_2$-responsive polymer to collapse on themselves on the surface of the cellulose nanocrystals (thus increasing pore size). Exposition of the membrane to the inert gas reverses this reaction (i.e. deprotonates) and yields the negatively charged form of the polymer chains, which is more hydrophilic and thus extends away from the surface of the cellulose nanocrystals (thus decreasing pore size).

The charge of the membrane of the invention therefore can be tuned between a neutral charge and a positive charge (said positive charge progressively increasing as the degree of protonation increases) or between a negative charge and a neutral charge (the negative charge progressively decreasing as the degree of protonation increases) by exposure to $CO_2$, and it can be tuned back to neutral or negative, respectively by exposure to an inert gas. Thus, the membrane of the invention has a charge tunability between neutral and positive or between negative and increasingly neutral.

It will be apparent to the skilled person that the membrane of the invention can also be used for charge-selective separation of solutes. Indeed, when the $CO_2$-responsive polymer is charged (either after exposure to $CO_2$ or an inert gas depending on the specific polymer used), it will cause the membrane to repel similarly changed solutes. Indeed, a positively charged membrane (e.g. a membrane with $CO_2$-responsive polymer bearing organobase functional groups after exposure to $CO_2$) will repel positively charged solutes. Conversely, a negatively charged membrane (e.g. a membrane with $CO_2$-responsive polymer bearing weak-acid carboxyl functional groups functional groups after exposure to an inert gas) will repel negatively charged solutes.

It will also be apparent from the above that the hydrophilicity of the membrane of the invention can also be tuned: said hydrophilicity progressively increasing as the degree of protonation of the amidine, amine, and/or guanidine (i.e. basic) functional groups increases or progressively decreasing as the degree of protonation of the weak-acid carboxyl functional groups increases by exposure to $CO_2$. It will also be similarly apparent that the hydrophilicity change can be reversed, respectively by exposure to an inert gas. Thus, the membrane of the invention has a hydrophilicity tunability.

In embodiments, the $CO_2$-responsive polymer bears organobase functional groups, preferably amidines, amines and/or guanidines functional groups and
when the membrane is exposed to $CO_2$, the chains of the $CO_2$-responsive polymer extend away from the surface of the cellulose nanocrystals, thereby decreasing the size of the pores in the active layer, and
when the membrane is exposed to an inert gas, the chains of the $CO_2$-responsive polymer collapse on themselves close to the surface of the cellulose nanocrystals, thereby increasing the size of the pores in the active layer.

In embodiments, the $CO_2$-sensitive polymer is a $CO_2$-sensitive polymer bearing amine functional groups, preferably poly((2-diethylamino) ethyl methacrylate) (PDEAEMA).

In alternative embodiments, the $CO_2$-responsive polymer bears weak-acid carboxyl functional groups and when the membrane is exposed to $CO_2$, the chains of the $CO_2$-responsive polymer collapse on themselves close to the surface of the cellulose nanocrystals, thereby increasing the size of the pores in the active layer, and when the membrane is exposed to an inert gas, the chains of the $CO_2$-responsive polymer extend away from the surface of the cellulose nanocrystals, thereby decreasing the size of the pores in the active layer.

In all cases, the inert gas is any gas that can reverse the extension or collapse of the $CO_2$-responsive polymer chains caused by exposure to $CO_2$. In embodiments, the inert gas is nitrogen or argon, more preferably nitrogen.

It should be noted that the chains of the $CO_2$-responsive polymer are grafted on the surface of the cellulose nanocrystals throughout the active layer (i.e. not just e.g. on cellulose nanocrystals located on the surface of the active layer). Furthermore, these $CO_2$-responsive polymer chains are grafted randomly all around the cellulose nanocrystals (i.e. not just on a part of the nanocrystals). The grafting density (i.e. the number of grafted $CO_2$-responsive polymer chains per area unit of the surface) is variable. Nevertheless, the grafting density must not be so high that the surface of the cellulose nanocrystals becomes too encumbered for the polymer chain to collapse. In addition, the grafting density must not be so low that the polymer chains are too sparsely distributed to actually reduce the pore size in the active layer. In embodiments, about 2% to about 20%, preferably about 5% to about 15%, and more preferably about 11% of the glucose units in the cellulose nanocrystals bear a chain of the $CO_2$-responsive polymer.

Herein, the "apparent pore size" of the membrane of the invention is the minimum pore size encountered, on average, by a particle/molecule crossing the membrane. It should be noted, of course, that such a particle/molecule must have a hydrodynamic diameter smaller that the thus-defined apparent pore size to be able to cross the membrane. The apparent pore size of the membrane of the invention determines its molecular weight cut-off (MWCO).

The apparent pore size of membrane of the invention is determined by the active layer. Indeed, while the active layer is arranged on the first porous support layer (or as described below arranged between the first porous support layer and a second porous support layer), these support layers have larger pores than the active layer. In consequence, the support layers do not determine which solutes can cross or are retained by the membrane. In other words, they have no influence on the apparent pore size and molecular weight cut-off.

The apparent pore size of membrane of the invention depends on the thickness of the active layer. Indeed, as noted above, the pores in the active layer are defined by the free spaces existing between the randomly arranged cellulose nanocrystals. Since these nanocrystals are randomly arranged, the free spaces between them vary somewhat in shape and size. To cross the active layer, a solute must navigate from one free space to the next all the way through the layer. The thicker the active layer, the longer the path the solute must follow, and the higher the likelihood that the solute will reach one of the smaller free spaces and be retained. As a result, the apparent pore size of the membrane decreases as the thickness of the active layer increases.

In embodiments, the active layer has a thickness between about 0.5 µm and about 15 µm, preferably between about 0.5 µm and about 10 µm, and more preferably between about 1 and about 6 µm.

The apparent pore size of membrane of the invention is furthermore gas-tunable as explained above.

Finally, the apparent pore size of membrane of the invention also depends on the molecular weight of the chains of $CO_2$-responsive polymer that are grafted on the surface of the cellulose nanocrystals. Indeed, even in the open configuration, the collapsed polymer chains occupy some space along the surface of the cellulose nanocrystals. The higher the molecular weight of the polymer chains, the bigger the space occupied by the polymer chains and the smaller the apparent pore size (and the maximal pore size reached in open gate configuration). Furthermore, higher molecular weight polymer chains are also longer than lower molecular weight polymer chains. This means that higher molecular weight polymer chains can extend further into the free spaces between the nanocrystals. In other words, the higher molecular weight polymer chains, when extended, allows a larger reduction of the apparent pore size than lower molecular weight polymer chains. The minimal pore size reached in closed gate configuration is smaller for higher molecular weight polymer chains. Those effects of the molecular weight of the chains of $CO_2$-responsive polymer allow to tailor the pore size and pore size tunability of the membrane as desired.

The pore size tunability of the membrane of the invention is defined as:

$$\text{Pore size tunability (\%)} = \frac{PS_{max} - PS_{min}}{PS_{max} + PS_{min}} \times 100$$

wherein $PS_{max}$ and $PS_{min}$ are the maximum and minimum apparent pore size of the membrane, respectively (i.e. the apparent pore size of the membrane in open and closed gate configurations).

The molecular weight cut-off (MWCO) varies proportionally as a function of the pore size. Hence, the MWCO tunability of the membrane will be affected by the same factors as the pore size tunability. The MWCO tunability of the membrane is defined as:

$$MWCO \text{ tunability (\%)} = \frac{MWCO_{max} - MWCO_{min}}{MWCO_{max} + MWCO_{min}} \times 100$$

wherein $MWCO_{max}$ and $MWCO_{min}$ are the maximum and minimum MWCO of the membrane, respectively (i.e. the MWCO of the membrane in open and closed gate configurations).

The flowrate through the membrane also varies proportionally as a function of the pore size. Hence, the flowrate tunability of the membrane will be affected by the same factors as the pore size tunability. The flowrate tunability is defined as the ratio of the maximum flowrate (i.e the flowrate in open gate configuration) on the minimum flowrate (i.e the flowrate in closed gate configuration). In other words:

$$FR \text{ tunability} = \frac{FR_{max}}{FR_{min}}$$

wherein $FR_{max}$ and $FR_{min}$ are the maximum and minimum flowrate of the membrane, respectively. For example, a flowrate tunability of 10 means that flow is 10 times faster through the membrane in open gate configuration than through the membrane in closed gate configuration.

In embodiments, the chains of the $CO_2$-responsive polymer have a molecular weight between about 5,000 and about 25,000 Da, preferably between about 9,000 and about 18,000 Da, and more preferably about 14,500 Da.

In view of the all the above, the membrane of the invention has an apparent pore size between about 0.5 nm (for a thick active layer in closed gate configuration) and about 100 nm (for a thin active layer in open gate configuration), preferably between about 1 nm and about 50 nm, and more preferably between about 3 nm and about 10 nm.

Consequently, the membrane of the invention has a molecular weight cut-off (MWCO) between about 1,000 Da to about 500,000 Da, preferably between about 2,000 Da and about 200,000 Da, and more preferably between about 20,000 Da and about 100,000 Da.

In embodiments, the membrane of the invention has a pore size tunability between about 10% and about 70%, preferably between about 20% and about 60%, and more preferably of about 50%.

In embodiments, the membrane of the invention has a MWCO tunability between about 20% and about 65%, preferably between about 40% and about 60%, and more preferably of about 50%.

In embodiments, the membrane of the invention has a flowrate tunability between about 2 and about 10, preferably of about 5.

The main difference between UF and NF membranes is pore size. However, depending on the prior art source consulted, the pore size limit between UF and NF varies and, in fact, the UF and NF pore size ranges often overlap. Nevertheless, an often-encountered definition is that provided by IUPAC, which defines UF membranes as "usually having a pore size" in the range 1 to 100 nm. IUPAC does not define the pore size of NF membranes per se but does mention they reject particles and dissolved macromolecules bigger than 2 nm. Given the apparent pore size of the membrane of the invention noted above, the membrane of the invention is considered an ultrafiltration/nanofiltration membrane ("UF/NF membrane"), which we define as a membrane with an apparent pore size such that it can be used as an ultrafiltration membrane, a nanofiltration membrane, or both.

In embodiments, the membrane of the invention further comprises a second porous support layers, and the active layer is arranged between the first and the second porous support layers. In other words, the membrane of the invention has a three-layer structure; more specifically a three-layer structure comprising a top and bottom support layers and the active layer inserted between the first and the second porous support layers.

Among other roles, the first and the second porous support layers prevent the cellulose nanocrystal from washing away from the active layer. However, when the cellulose nanocrystals are covalently bonded (e.g. crosslinked) to each other and, optionally to the first porous support layer, the second porous support layer is not necessary.

The porous support layers can be the same or different from one another.

In embodiments, the porous support layers are silver membranes, alumina oxide membranes, cellulose acetate membranes, mixed cellulose ester (MCE) membranes, nylon membranes, polyacrylonitrile (PAN) membranes, polyethersulfone (PES) membranes, polyester (PETE) hydrophilic membrane, polytetrafluoroethylene (PTFE) membranes, polyvinylidene fluoride (PVDF) hydrophilic membranes, glass fiber (GF) membranes, polycarbonate (PCTE) membranes, or a combination thereof (i.e. the first porous support layer is of one type and the second porous support layer is of another type. In preferred embodiments, the porous support layers are cellulose acetate membranes.

Method of Use of the Ultrafiltration/Nanofiltration Membrane

In another aspect of the invention, there is provided a method of filtering a feed using the membrane described in the previous section. This method comprises the step of contacting the feed with one side of the membrane and applying pressure to the feed so that materials to be separated from the feed pass through the membrane as a permeate.

In embodiments, the method further comprises the step of tuning the apparent pore size of the membrane by contacting the membrane with $CO_2$ or an inert gas. This tuning can be carried out before, during or after the filtering of the feed as desired. This step allows to tune the MWCO of the membrane according to the specific needs of the user. Furthermore, if those needs change during the filtration, the MWCO can advantageously be changed accordingly in situ during filtration.

In embodiments, the method further comprises the step of tuning the charge of the membrane by contacting the membrane with $CO_2$ or an inert gas. This step can be carried out before, during or after the filtering of the feed as desired. In embodiments, the step of tuning the charge of the membrane is a step of creating an increasingly positive charge on the membrane, creating an increasingly negative charge on the membrane, or increasingly neutralizing a positive or negative charge of the membrane. This step allows to tune the interaction of the membrane with charged species in the feed according to the specific needs of the user. Furthermore, if those needs change during the filtration, the interaction of the membrane with charged species can advantageously be tuned accordingly in situ during filtration.

In embodiments, the method further comprises the step of tuning the hydrophilicity of the membrane by contacting the membrane with $CO_2$ or an inert gas. This step can be carried out before or during the filtering of the feed as desired. In embodiments, the step of tuning the hydrophilicity of the membrane is a step of increasing hydrophilicity or decreasing hydrophilicity. This step allows to tune the interaction of the membrane with various species in the feed according to the specific needs of the user. Furthermore, if those needs change during the filtration, the interaction of the membrane with these species can advantageously be tuned accordingly in situ during filtration.

In embodiments, the method further comprises the step of tuning the flowrate through the membrane by contacting the membrane with $CO_2$ or an inert gas. This tuning can be carried out before, during or after the filtering of the feed as desired. This step allows to change the flowrate according to the specific needs of the user. Furthermore, if those needs change during the filtration, the flowrate can advantageously be changed accordingly in situ during filtration.

In embodiments, the method further comprises the step of cleaning the membrane. This cleaning step is typically carried out after the membrane has been used for filtrating a feed. However, it can also be performed before filtrating a feed. This cleaning step allow re-using a membrane that has already been used. Indeed, in use, membranes may become clogged, which undesirable reduce flow through the membrane. The cleaning step allows unclogging the membrane and restoring the membrane performances. Thus, in embodiments, the method further comprises, after said cleaning, the step of reusing the clean membrane to filter a feed. In embodiments, both of the above sets of steps (the one allowing matter clogging the membrane to cross the membrane and the one allowing matter clogging the membrane to flow back out of the membrane) are carried out consecutively (in any order).

In embodiments, the cleaning step comprises the step of increasing the apparent pore size of the membrane, preferably to a maximum pore size, by contacting the membrane with $CO_2$ or an inert gas.

In embodiments, the cleaning step comprises the step of increasing or decreasing the hydrophilicity of the membrane with $CO_2$ or an inert gas. This change promotes cleaning by changing, preferably increasing, the contact angle between matter clogging the membrane and the membranes' surface.

In embodiments, the cleaning step comprises the step of dislodging the matter clogging the membrane by exposing the membrane to $CO_2$ or an inert gas. Indeed, this causes the $CO_2$-responsive polymer chains to either extend away from the surface of the cellulose nanocrystals or collapse on themselves close to the surface of the cellulose nanocrystals, thereby dislodging said matter.

In some cases, either/both of the above will be sufficient to allow matter clogging the membrane to cross the membrane, thus cleaning the membrane. In embodiments, the feed flow rate can be increased to ease passage of the matter clogging the membrane across the membrane.

In other cases, the cleaning step further comprises the step of reversing the liquid flow across the membrane. This allows matter clogging the membrane to flow back out of the membrane, thus cleaning the membrane.

In embodiments, the cleaning step is carried out in situ at the location where the membrane has been used or will be used to filter the feed.

Once the membrane is cleaned, it can be brought back to its original configuration (i.e. by decreasing the pore size and/or reversing the hydrophilicity change and/or extending or collapsing the $CO_2$-responsive polymer chains as the case may be) by exposing the membrane to:
  $CO_2$ if it was exposed to an inert gas for cleaning or
  an inert gas if it was exposed to $CO_2$ for cleaning.
Then, the membrane can be reused.

In preferred embodiments, the membrane is cleaned at regular intervals during use by exposition to $CO_2$ and then an inert gas or by exposition to an inert gas and then $CO_2$, wherein such exposition dislodges matter clogging the membrane and preferably allows said matter to pass through the membrane and wherein the feed flow rate can be increased to ease said passage. Preferably, this is carried without any interruption of the filtration operation.

In a related aspect of the invention, there is provided a method of tuning the apparent pore size, the MWCO, the flowrate, the hydrophilicity and/or the charge of the above membrane. This method comprises contacting the membrane with $CO_2$ or an inert gas. This tuning is carried out before, during or after using the membrane for filtering a feed. In preferred embodiments, it is carried out at the beginning of the filtering or during the filtering, preferably by dissolving the $CO_2$ or the inert gas in the feed.

In another related aspect of the invention, there is provided a method of cleaning the above membrane after using the membrane for filtering a feed or while the membrane is being used for filtering a feed. This method comprises the step of increasing the apparent pore size of the membrane to a maximum by contacting the membrane with $CO_2$ or an inert gas and/or the step of increasing or decreasing the hydrophilicity of the membrane with $CO_2$ or an inert gas. In some cases, this will be sufficient to allow matter clogging the membrane to cross the membrane, thus cleaning the membrane. In embodiments, the liquid flow rate can be increased to ease passage of the matter clogging the membrane across the membrane. In other cases, the cleaning step further comprises the step of causing a solution to flow across the membrane in a direction reverse to the direction of the feed during filtering. This allows matter clogging the membrane to flow back out of the membrane, thus cleaning the membrane. In embodiments, both of the above sets of steps (the one allowing matter clogging the membrane to cross the membrane and the one allowing matter clogging the membrane to flow back out of the membrane) are carried out consecutively (in any order). Once the membrane is cleaned, it can be exposed $CO_2$ or an inert gas to decrease or increase the pore size and/or reverse the hydrophilicity change in view of for further use.

In preferred embodiments, the membrane is cleaned at regular intervals during use by exposition to $CO_2$ and then an inert gas or by exposition to an inert gas and then $CO_2$, wherein such exposition preferably allows matter clogging the membrane to pass through the membrane and wherein the feed flow rate can be increased to ease said passage. Then, the membrane can be used again. This allows cleaning the membrane without any interruption of the filtration operation.

In embodiments of any of the above methods, the $CO_2$ or the inert gas are dissolved in a solution or in the feed, preferably in the feed. In preferred embodiments, the $CO_2$ or the inert gas are dissolved in the solution or feed by bubbling the $CO_2$ or the inert gas in the solution or.

The skilled person will understand that the step of contacting the membrane with $CO_2$ or an inert gas in the above methods will have the effects described in the previous section. Those are not repeated here for conciseness.

Method of Manufacture of the Ultrafiltration/Nanofiltration Membrane

In another aspect of the invention, there is provided a method of manufacturing the above membrane. This method comprises the steps of:
  a) providing cellulose nanocrystals with chains of the $CO_2$-responsive polymer grafted on the surface of the cellulose nanocrystals,
  b) forming said cellulose nanocrystals into an active layer by randomly arranging said cellulose nanocrystals on a first porous support layer, and
  c') depositing a second porous support layer on the active layer and securing the first and second porous support layers together, or
  c") covalently bonding the cellulose nanocrystals to the first porous support layer.

In embodiments, step a) comprises the step of attaching (already formed) chains of the $CO_2$-responsive polymer to cellulose nanocrystals.

In alternative embodiments, step a) comprises the step of growing chains of the $CO_2$-responsive polymer on the surface of the cellulose nanocrystals. In embodiments, this step comprises attaching a polymerization initiator on the surface of the cellulose nanocrystals, and using the cellulose nanocrystals for initiating a polymerization reaction (for example an atom transfer radical polymerization) of monomers of the $CO_2$-responsive polymer, thus growing chains of the $CO_2$-responsive polymer on the surface of the cellulose nanocrystals.

In embodiments, the polymerization reaction is a "grafting from" method such as an atom transfer radical polymerization (ATRP), a Reversible Addition-Fragmentation chain Transfer (RAFT) polymerization, or a Nitroxide Mediated radical Polymerization (NMP), preferably an atom transfer radical polymerization (ATRP), or a "grafting to" method.

In embodiments, the polymerization initiator is a halogen, a di- or tri-(thiocarbonyl) (which are chain transfer agent for RAFT polymerization), or an alkoxyamine N-hydroxysuccinimidyl, preferably a halogen, and more preferably Br.

In embodiments, step b) comprises filtering a suspension of said cellulose nanocrystals using the first porous support layer. This filtration yields the active layer of the cellulose nanocrystals in which the cellulose nanocrystals are randomly arranged on the first porous support layer.

In step c'), the second porous support layer is deposited on top of the active layer, i.e. on the side of the active layer that is opposite the first porous support layer. This yields a stack of layers in which the active layer is located in-between the first and second porous support layers. Then, the first and second porous support layers are secured together. This step aims to enclose the active layer between the two support layers.

Step c") comprises covalently bonding (for example by crosslinking) the cellulose nanocrystals to the first porous support layer. In embodiments, step c") further comprises covalently bonding (for example by crosslinking) the cellulose nanocrystals to each other (in addition to their bonding with the first sup porous support layer). Both these steps increase the strength of the membrane allowing its use at higher feed flow rates. Further, these steps obviate the need for sandwiching the active layer between two porous support layers. Therefore, in embodiments, there is no second porous support layer in the membrane of the invention when the cellulose nanocrystals are covalently bonded. In alternative embodiments, after step c"), the method further comprises the step of depositing a second porous support layer on the active layer and securing the first and second porous support layers together.

In embodiments, the active layer does not occupy the whole area of the support layers; rather the periphery of the support layers is free of active layer and thus the first and second support layers are direct in contact with each other—see FIG. 7(d). In preferred embodiments, an adhesive is applied at the periphery of the support layers to secure the first and second porous support layers together. In embodiments, the method further comprises applying pressure—for example about 2 bars (30 psi) and even about 4 bars (60 psi)—to the membrane.

In embodiments, the method further comprises the step of priming the membrane by contacting the membrane with $CO_2$ and then contacting the membrane with an inert gas. This step allows the active layer to slightly swell and, as a result, to increase flowrate through the membrane. After this first, $CO_2$/inert gas cycle, the membrane and flowrate are typically stable for the next $CO_2$/inert gas cycles—see FIG. 10.

ADVANTAGES AND APPLICATIONS OF THE INVENTION

A main advantage of the membrane of the invention is that it has a gas-tunable pore size, i.e. a gas-tunable MWCO. As such, it can replace several membranes with different MWCO and thus constitute a cost-effective alternative to these membranes. At the same time, the charge of the membrane (and thus its interactions with charged species) and the flowrate through the membrane are also gas-tunable. Moreover, this pore size and interaction tuning can be achieved in situ during filtration, which is convenient and time-saving. In other words, filtration with the membrane of the invention provide operational flexibility.

The Examples below show a membrane of the invention with excellent tuning that is quick reversible, accurate, and reproducible over many cycles—see e.g. FIG. 10.

It should be noted that the apparent pore size of the membrane of the invention in the range between about 0.5 nm to about 100 nm, preferably between about 1 nm and about 50 nm, and more preferably between about 3 nm and about 10 nm. In other words, (preferably) in the lower end of the ultrafiltration range and in the nanofiltration range. Conversely, the MWCO of the membrane of the invention is in the range from about 1,000 Da to about 500,000 Da, preferably from 2,000 Da to about 200,000 Da, and more preferably from 20,000 Da to about 100,000 Da. Furthermore, the pore size tunability is from 10% to about 70%, preferably from 20% to about 60%, and more preferably of about 50% and the MWCO tunability is from 20% to about 65%, preferably from 40% to about 60%, and more preferably of about 50%. To the inventor's knowledge such characteristics are unmatched by other membranes. To the inventor's knowledge such characteristics are unmatched by other membranes.

The gas-tunable pore size allows for easier cleaning of the membrane. Indeed, the opening the pore to their maximum size (and optionally reversing flow through the membrane), matter clogging the membrane can more easily go through the membrane (or to flow back out the membrane when the flow has been reversed). As such, the regenerated membrane can thus be reused, which is cost-saving.

The fact that membrane is tunable using gases is advantageous. Those gases do not contaminate the feed, the permeate, or the membrane, not do they damage the membrane. Further, the gases are easy to use as it is sufficient to bubble them in a solution or feed that is in contact with the membrane. This is advantageous compared to membranes that are sensitive to other stimuli, which stimuli do tend to cause contamination and can be more difficult to use.

The gases used to tune the membrane ($CO_2$ and an inert gas, preferably $N_2$) are eco-friendly, cost-effective, non-toxic as well as easy and safe to use.

The active layer of the membrane is advantageously made of cellulose nanocrystals, which are biodegradable, biocompatible, non-toxic, abundant, relatively cheap, and renewable and can withstand various aqueous solutions. In addition, as shown in the example below, the above performances are achieved using low amount of the material in the active layer, e.g. around 9 gr/m$^2$, which reduces costs.

The membrane is robust and shows good pressure resistance (for example up to 2 bars, even 4 bars, and possibly more especially for thicker membranes), temperature resistance and chemical compatibility. In particular, the two support layers enclosing the active layer ensure the cellulose nanocrystals stay in place make the membrane robust, allowing long use and cleaning/reuse.

The method for producing the membrane of the invention is easy-to-implement, industrially-applicable, and reproducible.

The membrane can be used with various liquids (as long as they are compatible with cellulose). It is expected that the membrane of the invention will find application in many fields including:

medical: hemodialyse and sterilization;
industrial processes: high quality/ultrapure feedwater, and recovery/recycling of process water;
good and beverages: concentration, clarification, and fractionation;
drinking water and seawater pretreatment: clarification, and pretreatment in reverse osmosis (RO) and reverse electrodialysis (EDR) processes;
biopharmaceutical: laboratory equipment for centrifugation/separation; and wastewater treatment: domestic/municipal/agricultural/industrial/marine/naval, membrane bioreactors (MBR), Free of oil and grease (FOG) processes, and EDCs removal.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1—Cellulose Nanocrystal Membrane with PDEAEMA

We prepared a gas-tunable and re-usable cellulose nanocrystal membrane for active nanofiltration and ultrafiltration. More specifically, we made a smart ultrafiltration cellulose nanocrystal membrane whose pore size could be tuned within nanometers just by bubbling $CO_2$ and $N_2$, which are environmentally friendly and cost-effective stimuli, in aqueous solution passing through the membrane. The pore size of the membranes decreased gradually from an "open gate" state to a "closed gate" state by bubbling $CO_2$ and increased gradually back to their "open gate" state by bubbling $N_2$. The membranes showed excellent tunability for small pore size selectivity.

The Molecular Weight Cut-Off (MWCO) of the membrane in the "open gate" and "closed gate" states could be controlled by varying the membrane thickness. Three membranes of different thicknesses were thus prepared for filtration of molecules of different sizes: poly(ethylene glycol) (PEG), bovine serum albumin (BSA), and a positively charged dye (Rhodamine B). Indeed, we report below a CNC-based $CO_2$-responsive membrane which can effectively separate PEG of different molecular weights by size selectivity. In addition, we show the pore size tunability of the membrane for filtration of a protein (BSA) and a positively charged dye (Rhodamine B).

The membranes were made with CNC grafted with poly (N,N-diethylaminoethyl methacrylate) (PDEAEMA), which is $CO_2$ responsive. Indeed, grafting PDEAEMA onto CNC (referred to as CNC-g-PDEAEMA hereafter) made the cellulose nanocrystals $CO_2$-responsive. CNC-g-PDEAEMA was deposited on a cellulose acetate support membrane and then covered by another support membrane. By sandwiching the active CNC-g-PDEAEMA layer between support membranes, membrane degradation over repeated use cycles was avoided making the membrane reusable.

To the best of the inventors' knowledge, this is a first report for gas-responsive CNC membranes with reversible pore size tunability in the 3-10 nm range by gas stimuli and their use for molecular weight selective separation.

Experimental Section

Materials

Cellulose nanocrystals (CNC) were provided by Celluforce Inc. These cellulose nanocrystals were 5 to 10 nm width and 100 to 200 nm length.

The monomer 2-(diethylamino) ethyl methacrylate (DEAEMA), N,N,N',N',N"-Pentamethyldiethylenetriamine (PMDETA, 99+%) and copper(I) bromide (99.99%) were purchased from Aldrich. The cellulose acetate support membranes with pore size of 220 nm were purchased from Shanghai Xingya Purification Material. BSA, Rhodamine B and PEGs in different molecular weights (1000, 2000, 6000 and 20000 g/mol) were purchased from Sigma Aldrich.

CNC-g-PDEAEMA Synthesis

Synthesis of the Macroinitiator CNC-Br

As a first step, an α-halogen cellulose-ester was synthesized in DMF (see FIG. 4, first reaction step) in a procedure adopted from the literature (see Morandi et al. Cellulose Nanocrystals Grafted with Polystyrene Chains through Surface-Initiated Atom Transfer Radical Polymerization (SI-ATRP), Langmuir 2009, 25 (14), 8280-8286, incorporated herein by reference). Nanocrystals (1 g) were mixed with triethylamine (33 mL) and DMF (100 mL) under a nitrogen atmosphere. 2-Bromoisobutyryl bromide (26 mL) was then added dropwise under stirring. The mixture was stirred at 70° C. for 24 h and then filtered through an extraction thimble and washed with methanol.

Synthesis of CNC-g-PDEAEMA: Typical ATRP

Figure 4:
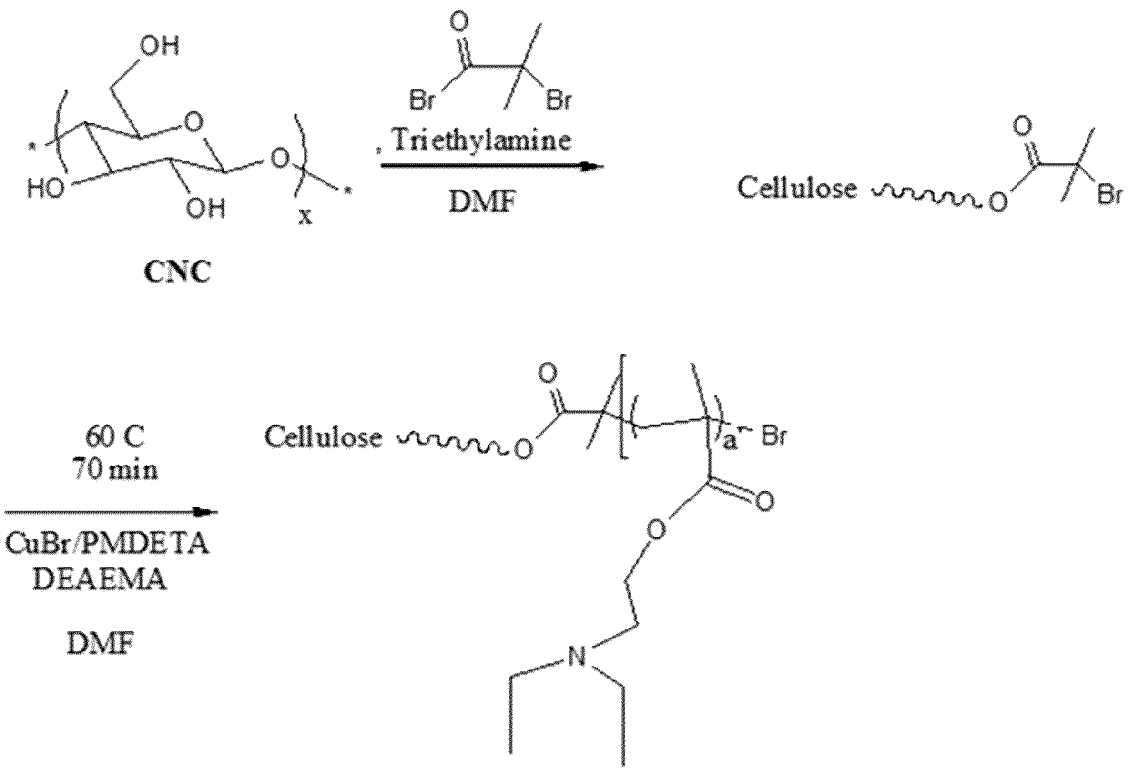
FIG. 4 shows the synthesis of CNC-g-PDEAEMA in two steps: preparing a Macroinitiator and then ATRP.
Figure 5:
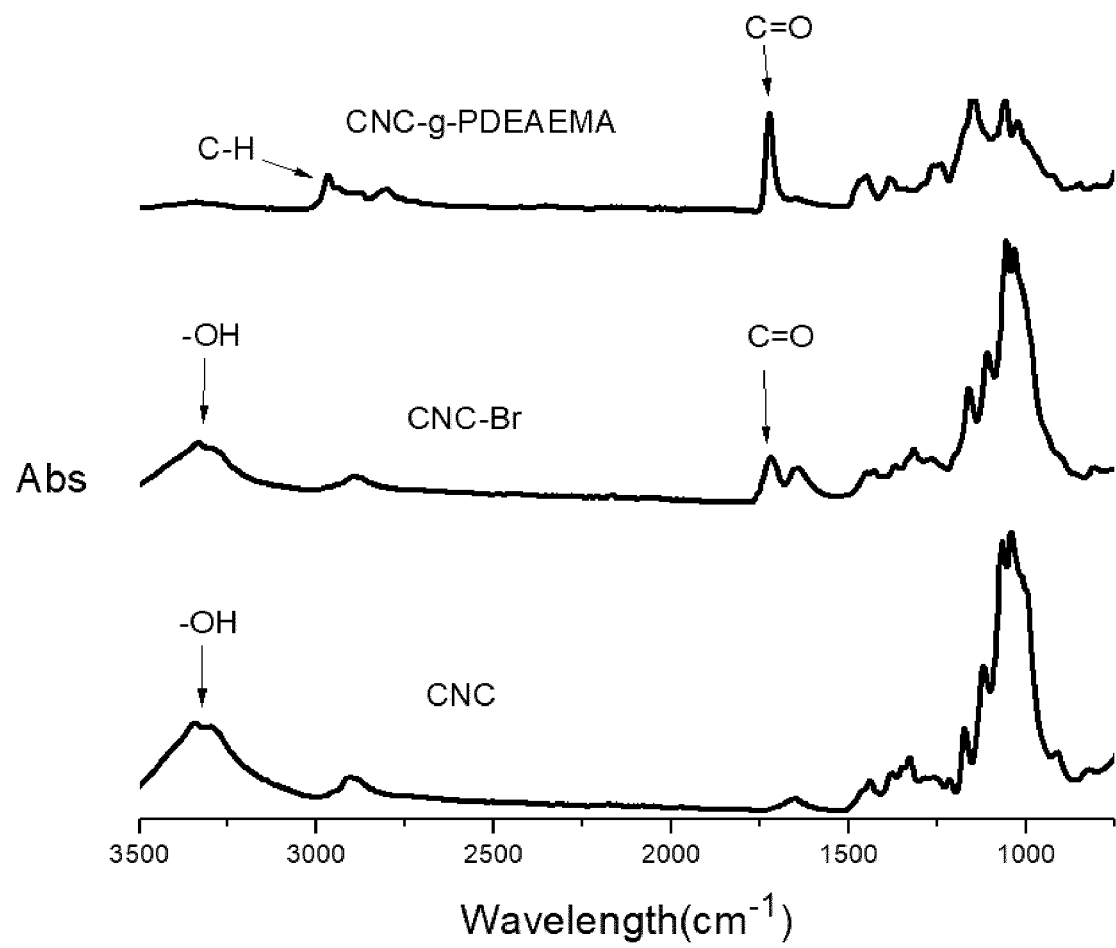
FIG. 5 shows the FT-IR spectra of unmodified CNC, CNC-Br, and CNC-PDEAEMA.

Then, CNC-Br was used as macroinitiator for polymerizing DEAEMA via ATRP using CuBr/PMDETA as a catalyst system—see FIG. 4, second reaction step. CNC-Br (45 mg, 0.1 mmol of Br), DEAEMA (3.46 g, 22.0 mmol), PMDETA (22 μL, 0.1 mmol), and DMF (15.0 g) were added into a dried flask with a magnetic stirring bar. After the macroinitiator was dissolved completely, Cu(I)Br (14 mg, 0.1 mmol) was introduced into the flask, and then the reaction system was degassed with three freeze-evacuate-thaw cycles. Then, the flask was immersed into an oil bath at 60° C. for 70 min. The polymerization was stopped by exposing the mixture to air and diluting with distilled water. The reaction mixture was dialyzed in a dialysis bag (molecular weight cut off: 3500) against distilled water for 72 h under bubbling $CO_2$. It was refreshed at an interval of 5 h². Characterization The formation of CNC—Br was confirmed by Fourier Transform Infrared (FT-IR). FIG. 5 shows the FT-IR spectra for the unmodified CNC, CNC—Br and CNC-g-PDEAEMA. The stretching vibration of carbonyl groups of esters in 2-bromopropionyl group appeared at 1741 $cm^{-1}$ showed the combination of macroinitiator. The FT-IR spectrum of CNC-g-PDAEAMA shows a strong peak at 1741 $cm^{-1}$ for ester groups in the polymer backbone and the stretching vibration of C-H bands in the polymers backbone appeared between 2800-2900 $cm^{-1}$. Because the grafted polymer covers the surface of the CNC, the hydroxyl peaks of the CNC had a very low intensity in the CNC-g-PDAEAMA FT-IR spectrum.

The bromine content of CNC—Br, i.e. the degree of substitution (DS) for the macroinitiator, and degree of polymerization (DP) of PDEAEMA on CNC were calculated from their respective solid-state $^{13}C$ NMR (SSNMR) spectra using the equations 1 and 2, respectively.

$$DS = A'_{167}/A'_{105} \quad \text{eq. 1}$$

$$DP = \left(\frac{A_{175}/A_{105} - A'_{167}/A'_{105}}{A'_{167}/A'_{105}}\right) \quad \text{eq. 2}$$

in which $A'_{167}$ is integral at 167 ppm and $A'_{105}$ is integral at 105 ppm in the CNC—Br SSNMR spectrum, while $A_{175}$ is integral at 175 ppm and $A_{105}$ is integral at 105 ppm in the CNC-g-PDEAEMA-b SSNMR spectrum.

Figure 6:
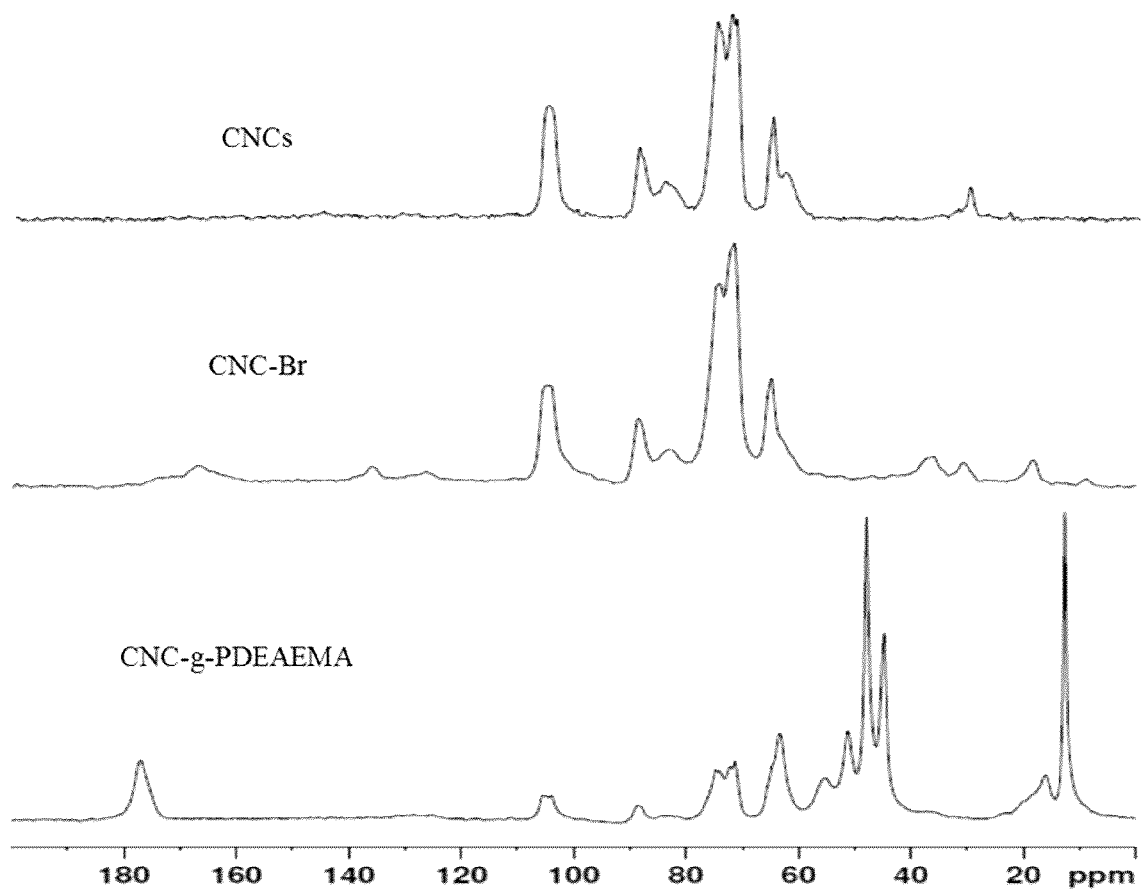
FIG. 6 shows the SSNMR spectra of unmodified CNC, CNC-Br, and CNC-g-PDEAEMA.

The solid-state $^{13}C$ NMR spectra of unmodified CNC, CNC—Br, and CNC-g-PDEAEMA are shown in FIG. 6. In this figure, the appearance of peaks at 167, 36, 31 and 18 ppm for CNC—Br indicated that the ester group was successfully localized on CNCs. The bromine content was calculated from eq. 1 and found to be approximately 11 initiator sites with Br for every 100 glucose units. The spectra show that the crystallinity of CNC remained unchanged after macroinitiator synthesis (as interpreted by comparing peaks of C4 in the CNC and CNC—Br³ spectra). The extent of the polymerization is clearly apparent from the carbons of PDEAEMA: the sharp peaks at 15, 45 and 175 ppm. The DP was calculated from eq. 2 and found to be about 78.5.

Membrane Preparation

Figure 7:
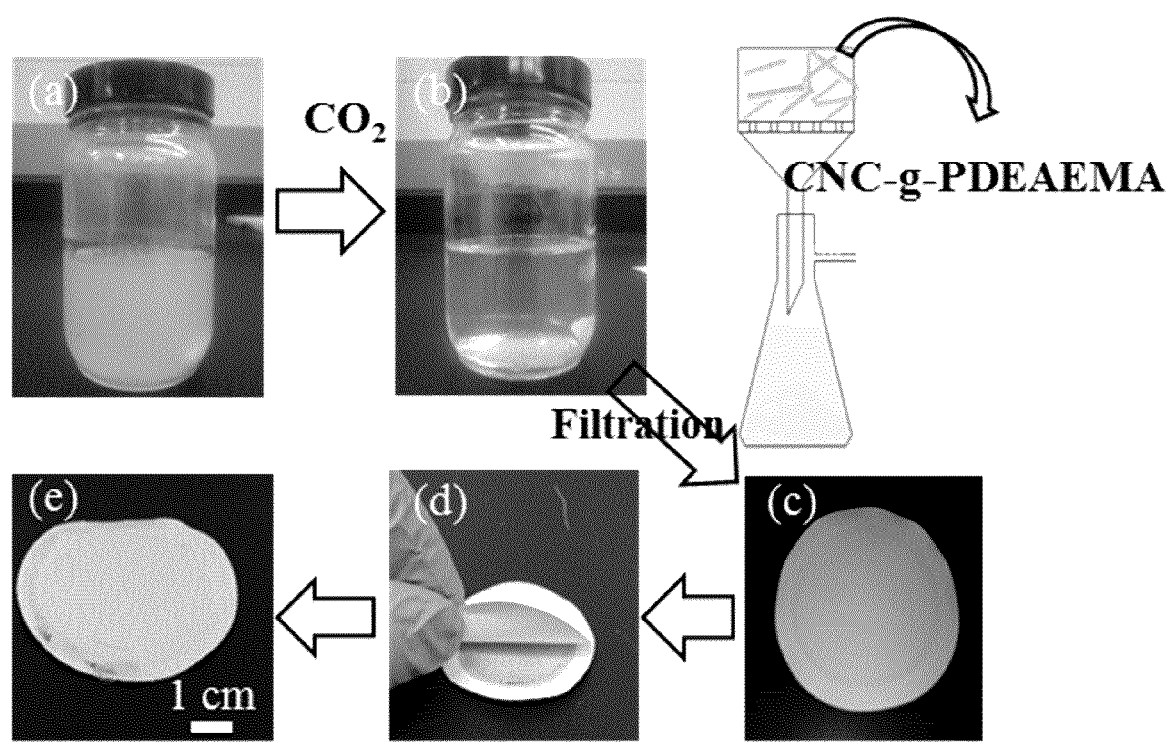
FIG. 7 shows the membrane preparation steps.

FIG. 7 shows the steps for the membrane preparation. CNC-g-PDEAEMA was dispersed in water (0.05 wt %), forming an opaque suspension (FIG. 7a); upon $CO_2$ bubbling, protonated PDEAEMA chains on CNC rendered CNC-g-PDEAEMA soluble and the solution turned completely transparent (FIG. 7b). Three CNC-g-PDEAEMA membranes of varying thickness, denoted as M1, M2 and M3, were obtained by filtrating 10, 15 and 20 mL of this solution, respectively, on a supporting cellulose acetate membrane (FIG. 7c). The effective filtration area was 10.74 $cm^2$, filtering by vacuum assisted method. The gas-responsive CNC-g-PDEAEMA membranes were then covered by another cellulose acetate support membrane to be sandwiched (FIG. 7d). After applying a glue around the edge of the circular membrane (ineffective region), the whole was pressed under 2 Mbar pressure to yield a uniform membrane (FIG. 7e).

Characterization

FT-IR spectra of the samples were taken on an AVATAR 360 ESP FT-IR spectrometer (Nicolet, U.S.A.) equipped with a MKII Golden Gate, single reflection ATR system, and 64 scans were recorded in the range 3800-800 cm-1 for each spectrum.

Solid-state NMR (SSNMR) spectra were acquired on a 400 MHz Varian VNMRS spectrometer using a 4 mm double-resonance Varian Chemagnetics T3 probe operating at 399.77 MHz for 1H and 100.53 MHz for 13C. Approximately 35 mg of sample were center-packed into rotors. Samples were spun at 13 kHz using the multiCP sequence of Johnson and Schmidt-Rohr (see Johnson, R. L.; Schmidt-Rohr, K. Quantitative Solid-State 13C NMR with Signal Enhancement by Multiple Cross Polarization. J. Magn. Reson. 2014, 239, 44-49, incorporated herein by reference). MultiCP parameters were based on those suggested by Bernardinelli et al. with a recycle delay of 2 s and 10 contact periods of 0.95 s each using a spin-lock field of approximately 60 kHz each separated by 0.9. SPINAL-64 decoupling at an rf field of 90 kHz was applied during acquisition. 1024 scans were acquired for the CNC sample, 2680 scans for the CNC—Br sample, and 8708 scans for the CNC-g-PDEAEMA sample. 1H 90 pulses were 2.4 µs long and 13C pulses were 3.7 µs long (see Bernardinelli, O. D.; Lima, M. A.; Rezende, C. A.; Polikarpov, I.; deAzevedo, E. R. Quantitative 13C MultiCP Solid-State NMR as a Tool for Evaluation of Cellulose Crystallinity Index Measured Directly inside Sugarcane Biomass. Biotechnol. Biofuels 2015, 8 (1), 110, incorporated herein by reference).

The morphology and thickness of the membranes were studied by using a Hitachi S-4700 field emission-gun scanning electron microscope (SEM) operating at 1.0 kV to 10.0 kV. The membranes were frozen in liquid nitrogen, fractured immediately, and then dried. For SEM observation, a fine platinum coating layer (a few nm) was deposited on the sample surface using a K550 sputter coater for 1 or 2 min.

To assess the performance of the membranes, PEG concentration changes were monitored by size exclusion chromatography (SEC) on a Tosoh EcoSEC GPC system, equipped with three TSK-GEL Super AWM-H columns (6×150 mm). The measurements were conducted at room temperature using dimethylsolfoxide (DMSO) containing 1.25 mg mL-1 of LiBr as the eluent (flow rate: 0.3 mL min-1) and poly(methyl methacrylate) (PMMA) as standards. PEGs dissolved in DMSO were injected into the instrument through an automatic injection system.

UV-Visible spectra for the concentration monitoring of BSA and Rhodamine B were recorded using a UV-Vis-NIR spectrophotometer (Agilent Cary 50 Bio).

Figure 8:
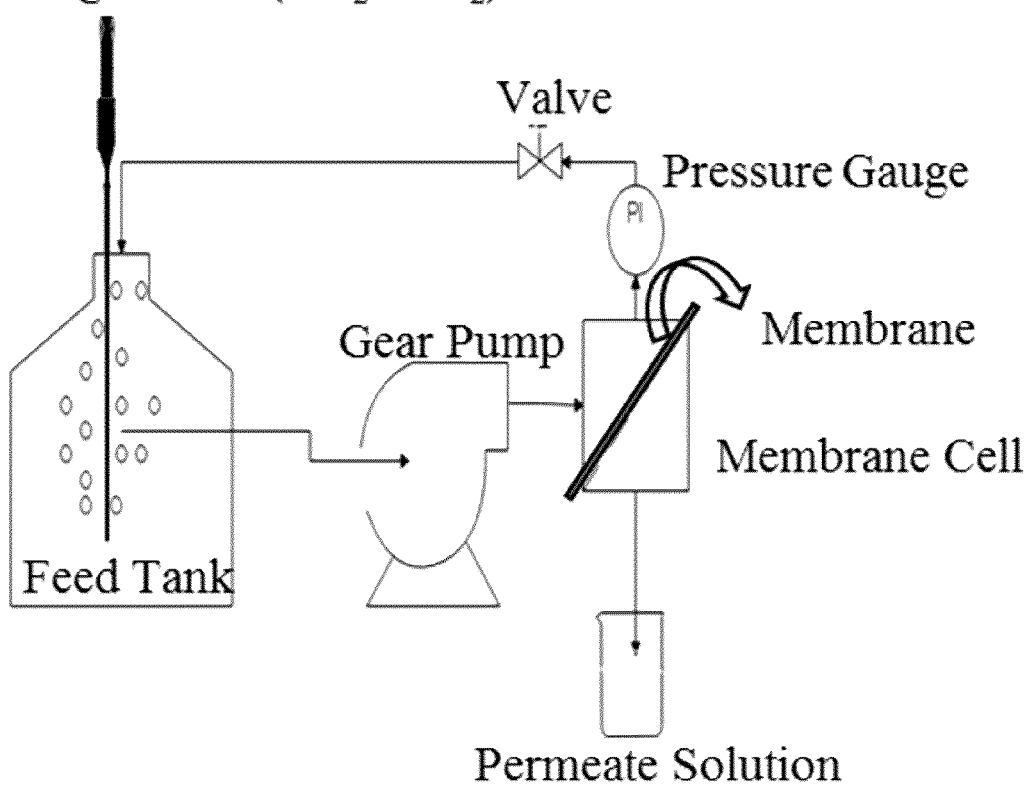
FIG. 8 is a schematic diagram of the experimental filtration setup.

A schematic diagram of the experimental filtration set-up is shown in FIG. 8. One liter of the feed was pumped into the filtration cell. An effective area of 10 $cm^2$ was employed for the rejection. The operating pressure was constant for all the experiments (2 bar) and it was adjusted by an outlet valve. All the experiments carried out at room temperature, and the concentration for the solutes in the feed tank was 200 ppm and due to small amount of sample were taken after filtration, the feed concentration was considered approximately constant.

The averaged pure water flux ($L/m^2$ h) was calculated by every 2 min for bubbling $CO_2$ and 5 min for bubbling $N_2$. For pure water flux, 2 bar pressure was employed and the flux was determined by equation (3):

$$J = \frac{V(L)}{A(m^2) \cdot t(h) \cdot P(\text{bar})} \qquad \text{eq. 3}$$

in which V, A, t and P are the volume, area, time and pressure, respectively.

For all the tests with PEG, BSA or Rhodamine B, the rejection ratio (R %) was calculated using equation (4):

$$R(\%) = (1 - Cp/Cf) \cdot 100 \qquad \text{eq. 4}$$

in which Cp and Cf are the PEG, BSA or Rhodamine B concentrations in the permeate and feed solutions, respectively.

Results and Discussion

Figure 9:
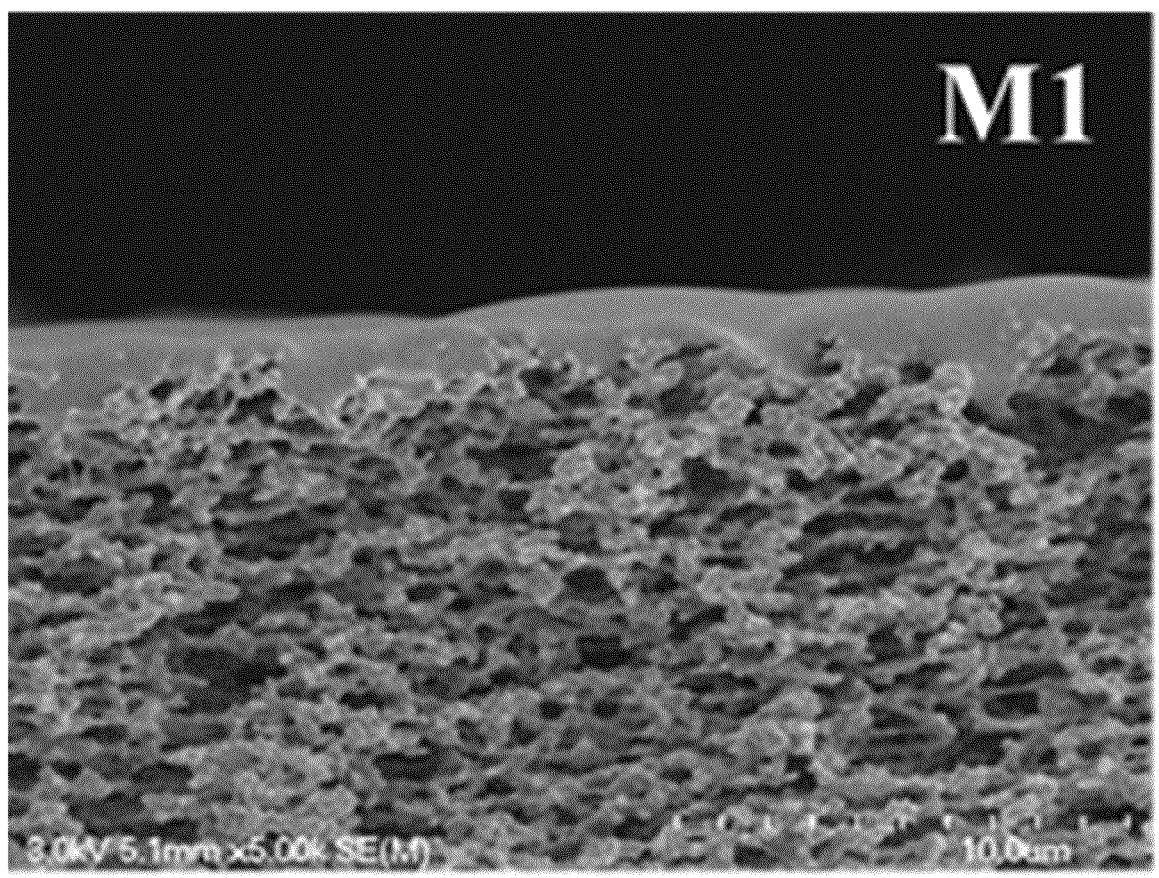
FIG. 9 A) is a SEM image of the cross-sections of membrane M1.
Figure 9:
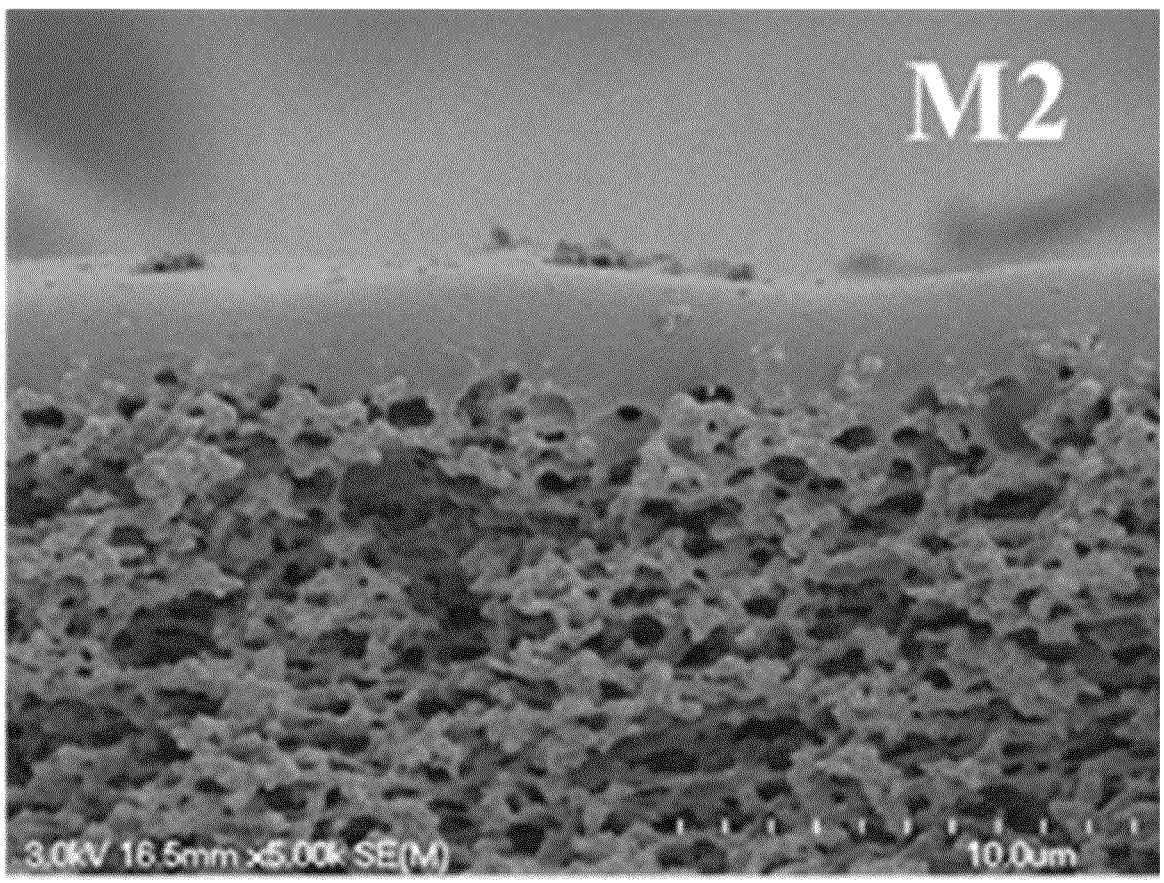
Figure 9:
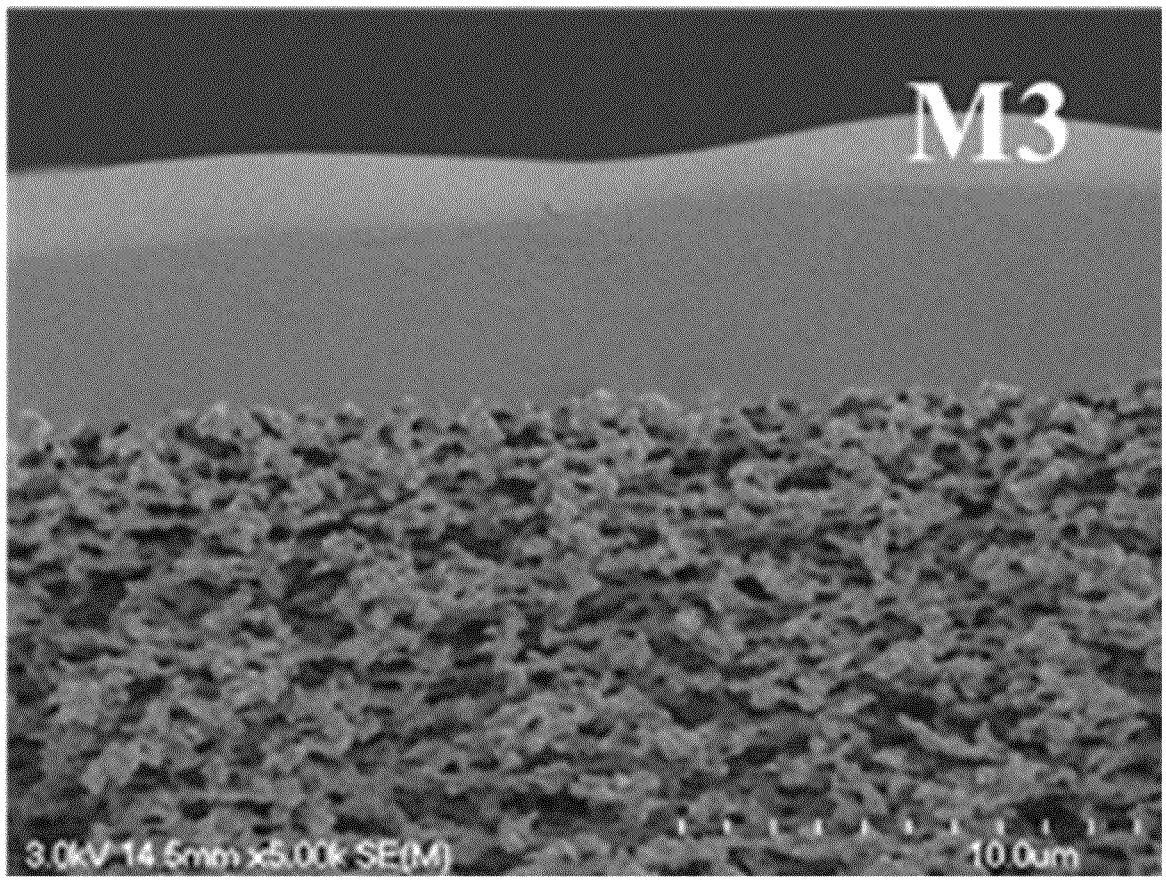

The CNC-g-PDEAEMA suspensions were filtered by vacuum-assisted method, and due to larger size of the grafted CNC, one layer of the CNC-g-PDEAEMA active materials formed on the support membrane. The cross-sections of membranes M1, M2, and M3 as revealed by SEM are shown in FIG. 9. The membranes fabricated by CNC-g-PDEAEMA aqueous solution showed different thicknesses related to the used different volumes of the suspension. For M1, M2 and M3, 10, 15 and 20 mL (0.05 wt % in CNC-g-PDEAEMA) of the suspension were used, respectively. From the SEM photographs, the thicknesses were about 1.5 µm for M1, 3 µm for M2 and 5.5 µm for M3. The active layer of CNC-g-PDEAEMA was glue-like, which allowed the membranes to sustain high pressure. The effective area for filtration was 10.74 cm$^2$ and the amount of CNC-g-PDEAEMA for M1, M2 and M3 were 4.65, 6.97 and 9.3 gr/m$^2$, respectively. It is worth being emphasized that the excellent performances reported below were achieved using such small amounts of the active material (CNC-g-PDEAEMA).

Figure 10:
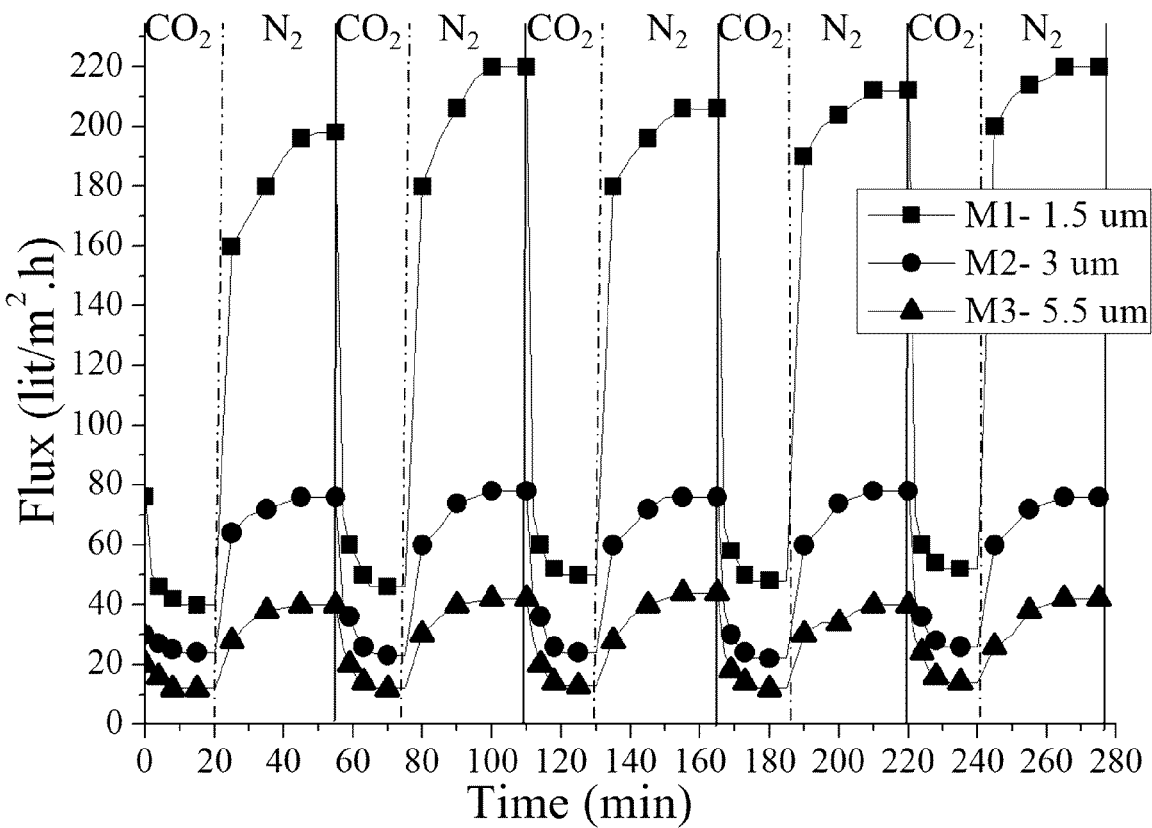
FIG. 10 shows the water flux of membranes M1, M2, and M3 during five cycles of bubbling $CO_2$ and $N_2$.

FIG. 10 shows the water flux of membranes M1, M2, and M3 during five cycles of bubbling $CO_2$ and $N_2$. The water permeability of the membranes changed by bubbling $CO_2$ and $N_2$ in the permeate water. The PDEAEMA on the CNCs allowed the broadening and tightening of the pore size between an open gate configuration and a close gate configuration in response to $CO_2/N_2$.

Figure 11:
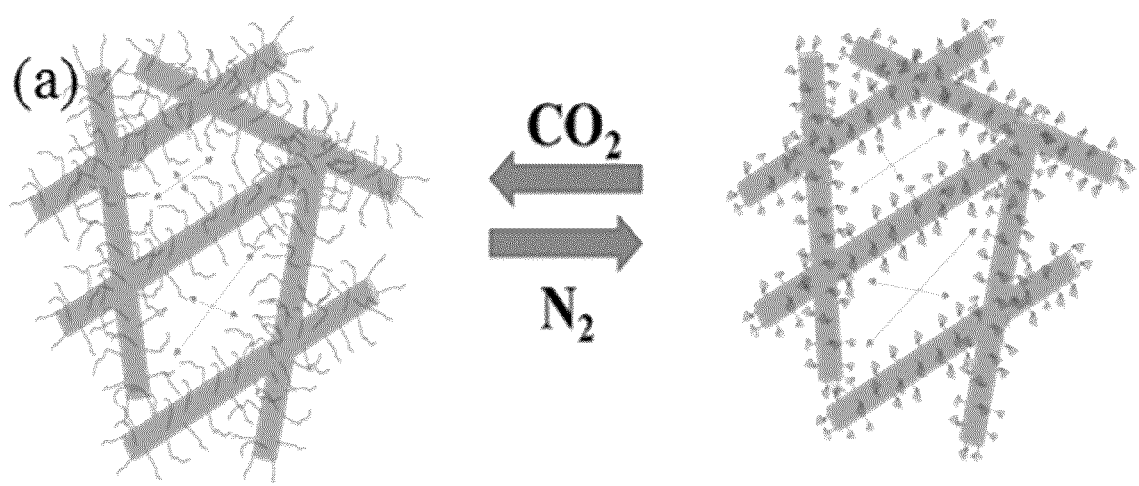
FIG. 11 is a top view of a membrane of the invention in the closed gate configuration (left) and in the open gate configuration (right).

The mechanism allowing to tune the pore size is depicted in FIG. 11, which shows the maximal pore size change in response to the gases. As can be seen in this figure, PDEAEMA chains were grafted all around the rod-like cellulose nanocrystals. At room temperature and pH=7, the PDEAEMA chains are insoluble in water and thus collapsed unto themselves close to the CNC surface to which they are attached. As a result, the free volume in-between the rod-like CNCs, the pore size, and the water flux are at their maximum. In other words, the membrane is in the open gate configuration. By bubbling $CO_2$ in the solution traversing the membrane, the PDEAEMA chains become increasingly water-soluble due to the gradual protonation of their tertiary amines. As a result, the PDEAEMA chains increasingly adopt an extended conformation, thus progressively filling the spaces in-between the CNCs. In other words, the free volume in-between the rod-like CNCs, the pore size, and the water flux decrease toward their minimum, at which point the membrane is in its closed gate configuration with the PDEAEMA chains being as extended as possible.

Subsequently, by bubbling $N_2$ in the solution traversing the membrane $N_2$, the tertiary amines of the PDEAEMA chains became deprotonated and increasingly collapsed unto themselves on the CNC surface. In other words, the free volume in-between the rod-like CNCs, the pore size, and the water flux increase again, and the membrane eventually reaches its open gate configuration.

After fabrication of the membranes, the initial water flux was about 76, 30 and 24 L·m$^{-2}$·h$^{-1}$ for M1, M2 and M3, respectively, which is lower than the next high flux of five cycles (under $N_2$ stimulation) —see FIG. 10. This is due to the pression applied during membrane preparation which decreased the free volume between CNCs and consequently decreased the water flux. However, after one cycle passing $CO_2$, the active CNC layer swelled, and the free volume increased. The swelled structure kept its shape for the next five cycles, and the membranes showed good reversibility over the five cycles tested. Overall, the water flux of the membrane switched between about 210 and 40 L·m$^{-2}$·h$^{-1}$ for M1, 80 and 24 L·m$^{-2}$·h$^{-1}$ for M2, and 40 and 10 L·m$^{-2}$·h$^{-1}$ for M3 upon bubbling $N_2$ and $CO_2$, respectively. All the experiments were carried out at a pressure of 2 bars.

Figure 12:
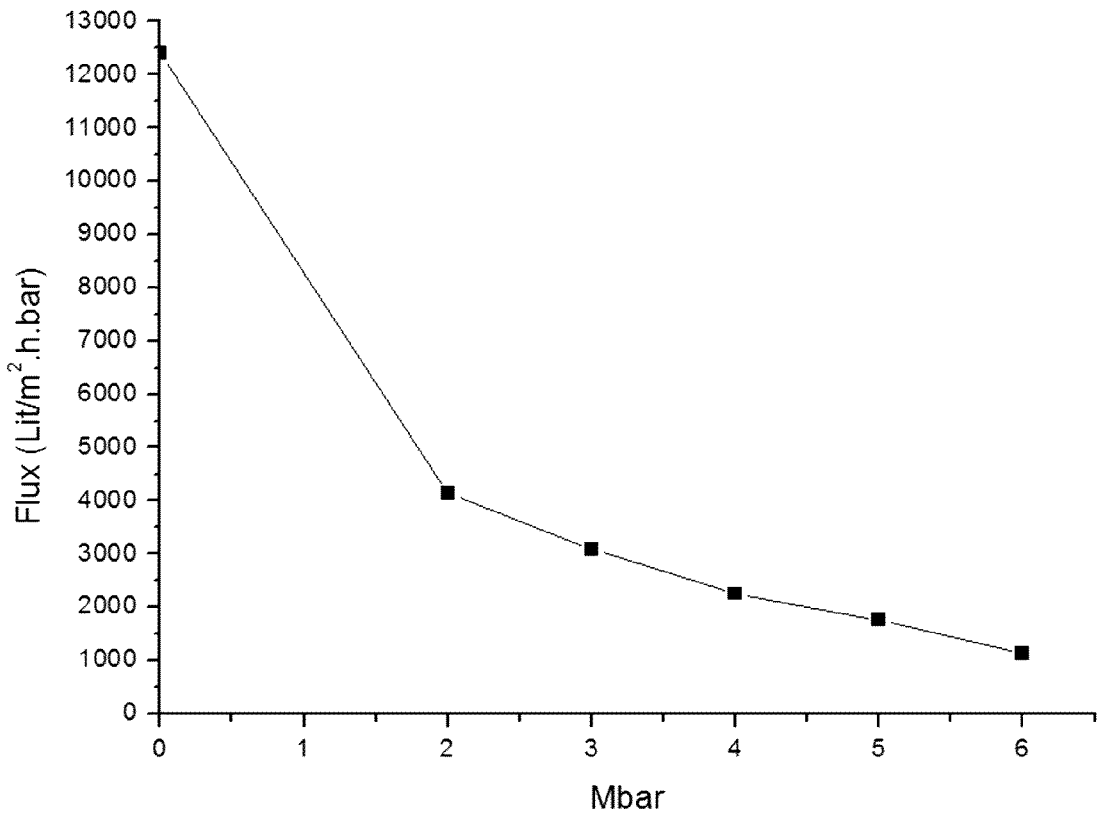
FIG. 12 shows the effect of the pressure applied on two support membranes on their water permeability (Flux).

The effect of the pressure applied on a stack of two support membranes on its water permeability is shown in FIG. 11. During the preparation of membranes, in order to obtain highly stable membrane, pressure is applied—see step e) in FIG. 7. Higher pressures decrease the resulting membrane water permeability because it decreases the thickness of support membranes, which reduces pore size and water permeability. For preparing membrane M1 to M3, we applied a pressure of 2 Mbar. FIG. 12 shows that this pressure results in a support membrane water flux higher flux than that of active layer, CNC-g-PDEAEMA. In other words, this ensured that the pression applied during membrane preparation did not reduce support membranes water permeability below that of the active layer, thus did not lower the water permeability of the overall membrane.

The variation in water permeability between the thicker and thinner membranes was due to the longer pathway of water molecules through the thicker membranes. Indeed, the thinner membrane had a shorter pathway, compared to the thicker membrane, so water could pass thorough more easily. This had a direct effect on the membranes filtration performances and their size selectivity applications.

PEG

Figure 13:
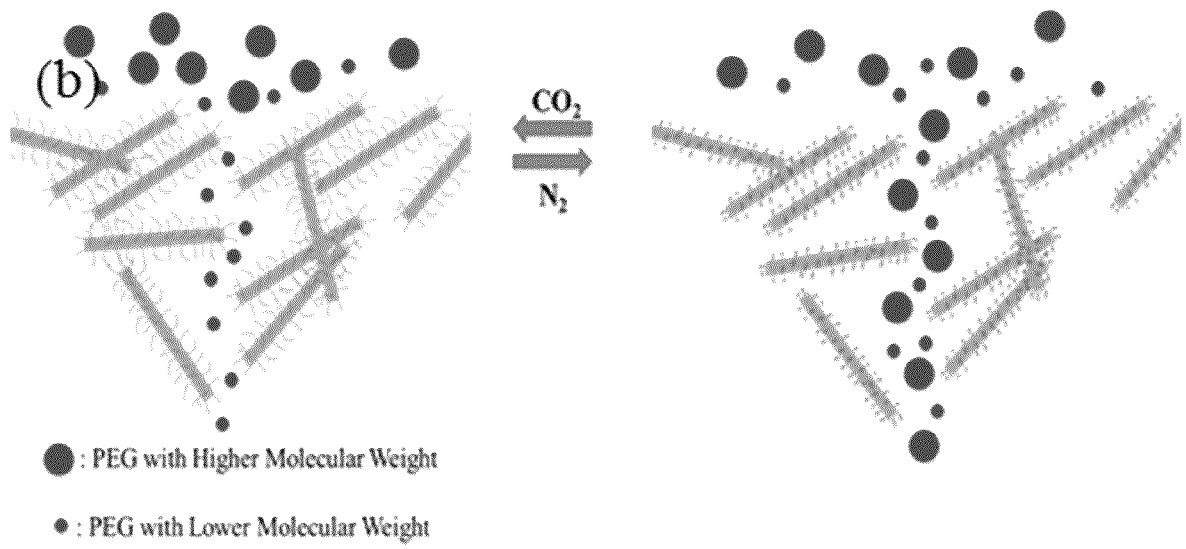
FIG. 13 is a cross-sectional view of a membrane of the invention in the closed gate configuration (left) and in the open gate configuration (right) discriminating or not, respectively, PEGs of different size.

The size selectivity filtration of the membranes was investigated using uncharged, water-soluble PEG. FIG. 13 is a cross-sectional view of a membrane in the closed gate configuration (left) and in the open gate configuration (right) discriminating or not, respectively, PEGs of different size. This figure shows the change in pore size and the membrane selectivity mechanism for PEGs of two different molar masses. After protonation with $CO_2$, the extended PDEAEMA clearly decreases the free volume and only the small PEGs can pass through. On the other hand, after deprotonation with $N_2$, the PDEAEMA chains collapsed unto themselves resulting in a higher free volume that allows bigger molecules to cross the membrane.

Four PEG samples (MW 1,000, 2,000, 6,000 and 20,000 g/mol with hydrodynamic diameter of about 0.74, 1.07, 1.94 and 3.72 nm, respectively (see Ye, X.; Yang, J.; Ambreen, J. Scaling Laws between the Hydrodynamic Parameters and Molecular Weight of Linear Poly(2-Ethyl-2-Oxazoline). RSC Adv. 2013, 3 (35), 15108-15113, incorporated herein by reference) were used as solutes in the feed solutions with a solute concentration of 200 ppm for each PEG, under a pressure of 2 bars. In each set of experiment, two PEGs, one with a higher molecular weight and the other with lower molecular weight, were selected and filtered by the membranes. As explained above, the membrane pore size changed upon the action of the gases. Therefore, the high molecular weight PEG could not pass through the pores after bubbling CO$_2$ due to the expansion of PDEAEMA chains (closed gate configuration state), but it could go through the membrane after bubbling N$_2$ which opened the pores (open gate configuration). By contrast, the low molecular weight PEG could pass through the pores even after CO$_2$ stimulation due to its small hydrodynamic diameter.

Figure 14:
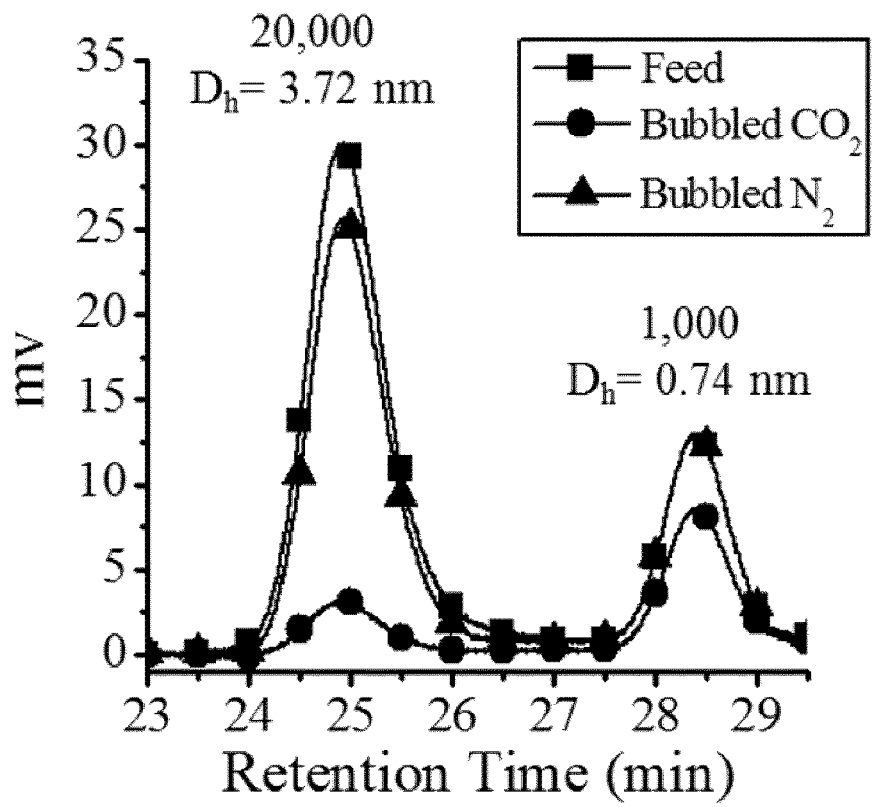
FIG. 14 A) shows the SEC spectra of a PEG 1,000 gr/mol and 20,000 gr/mol feed solution, the permeate obtained after filtration with membrane M3 treated with $CO_2$, and the permeate obtained after filtration with membrane M3 treated with $N_2$.
Figure 14:
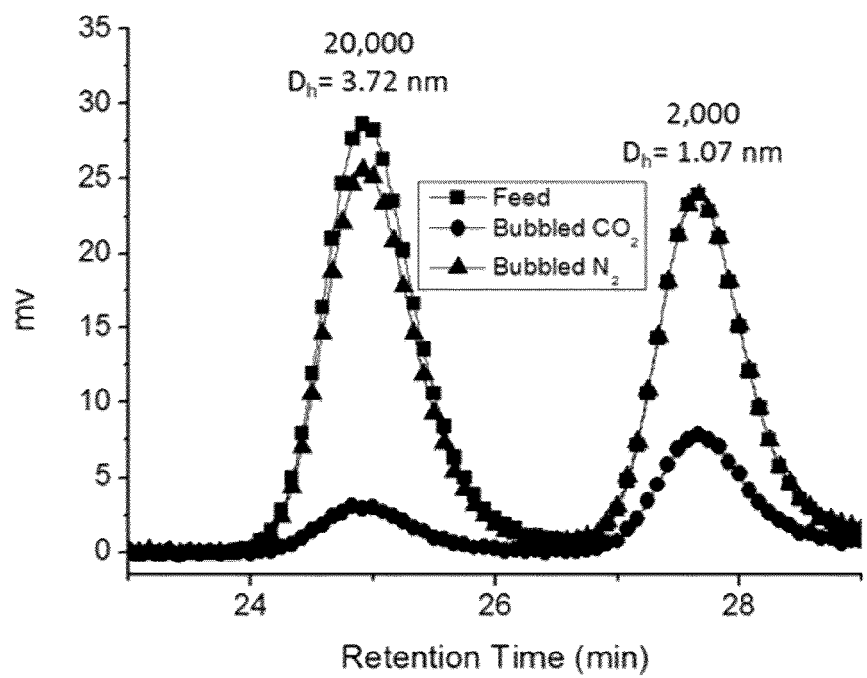
Figure 14:
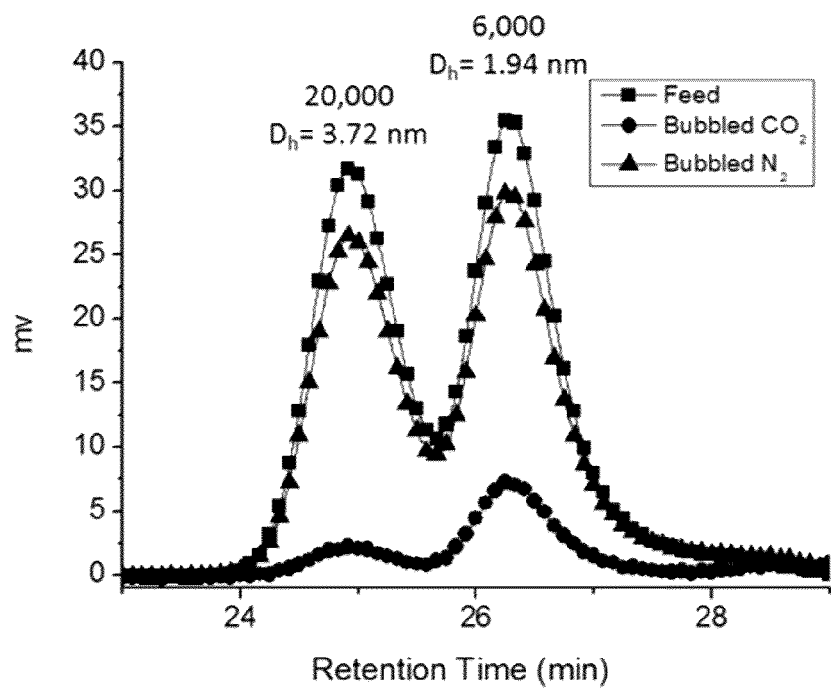

As an example, FIG. 14A) presents the SEC results using the membrane M3 for the mixture of PEG 1,000 gr/mol and PEG 20,000 gr/mol. For PEG 20,000 gr/mol, the membrane exhibited a high rejection of 91.4% under CO$_2$ and a low rejection rate of 17.6% under N$_2$. For PEG 1,000 gr/mol, the rejection switches between 31.8% under CO$_2$ and 0% under N$_2$. Due to this size-dependent rejection, when the mixture of the two PEG samples is filtered using M3 under CO$_2$, most PEG 1,000 gr/mol passes through while most PEG 20,000 gr/mol is retained by the membrane, effecting a size-selective separation with distinction between hydrodynamic diameters of about 0.74 and 3.76 nm.

Figure 15:
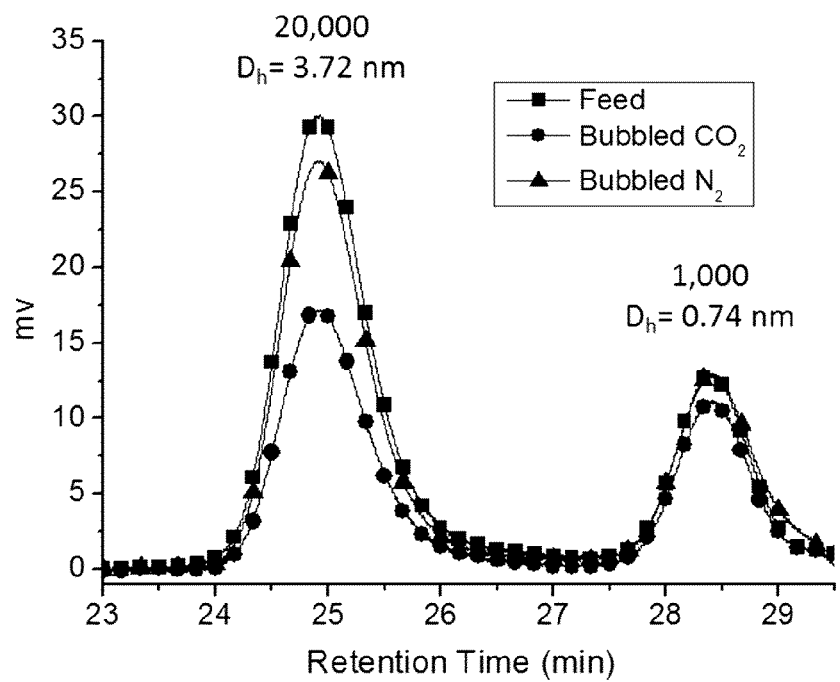
FIG. 15 A) shows the SEC spectra of a PEG 1,000 gr/mol and 20,000 gr/mol feed solution, the permeate obtained after filtration with membrane M2 treated with $CO_2$, and the permeate obtained after filtration with membrane M3 treated with $N_2$.
Figure 15:
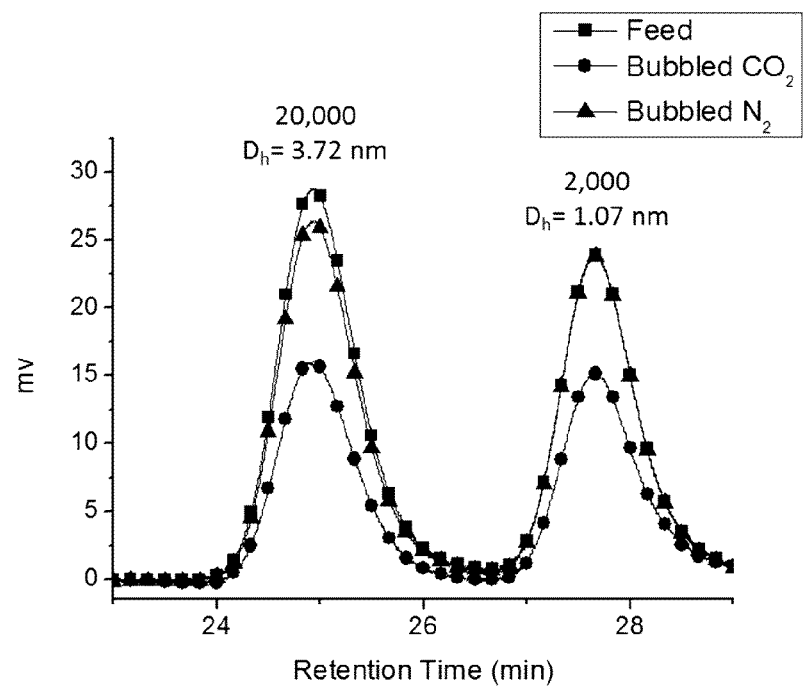
Figure 15:
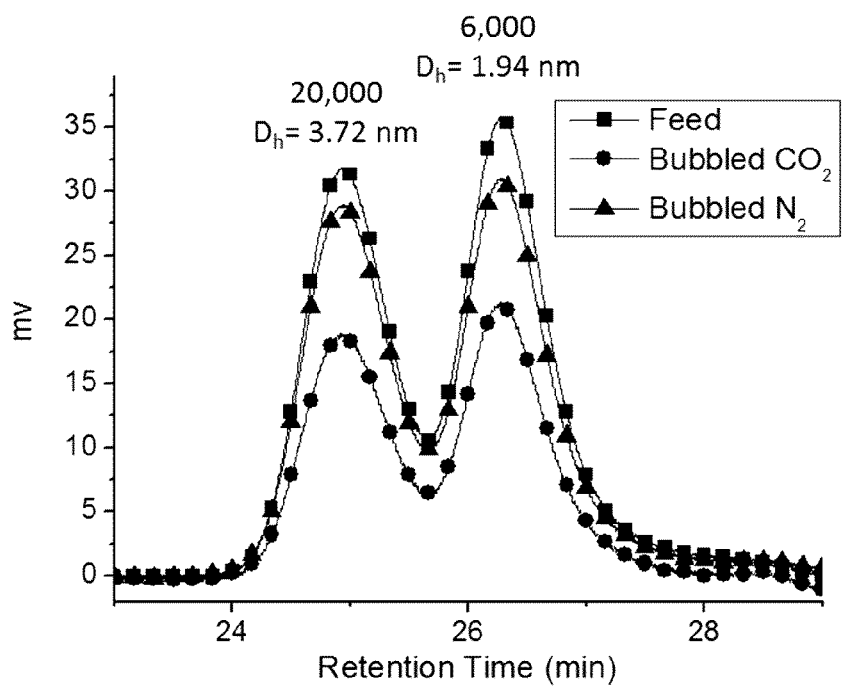
Figure 16:
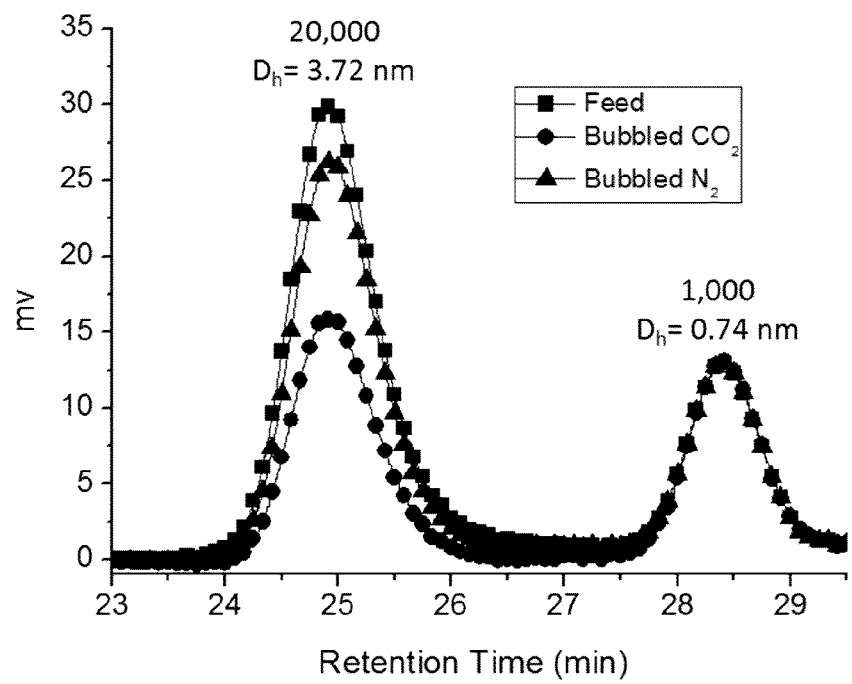
FIG. 16 A) shows the SEC spectra of a PEG 1,000 gr/mol and 20,000 gr/mol feed solution, the permeate obtained after filtration with membrane M1 treated with $CO_2$, and the permeate obtained after filtration with membrane M3 treated with $N_2$.
Figure 16:
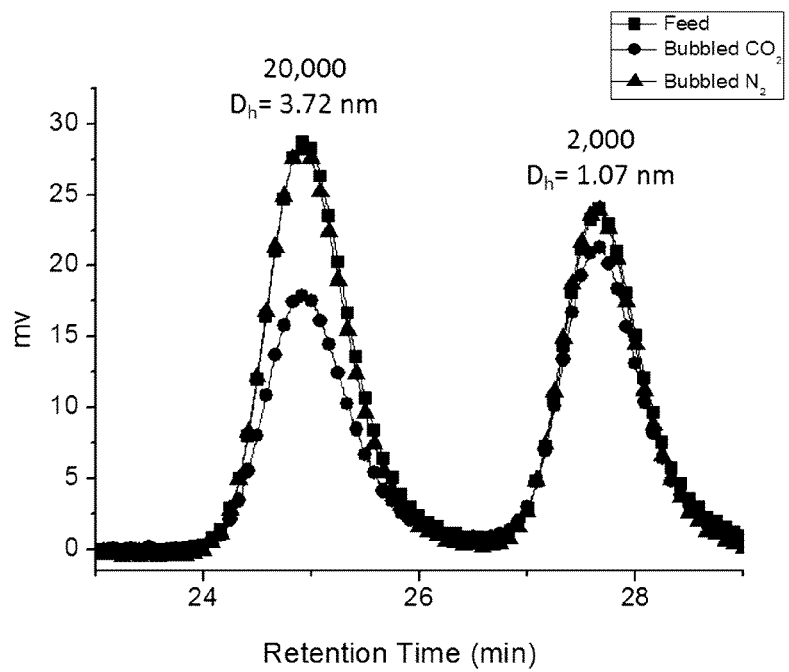
Figure 16C:
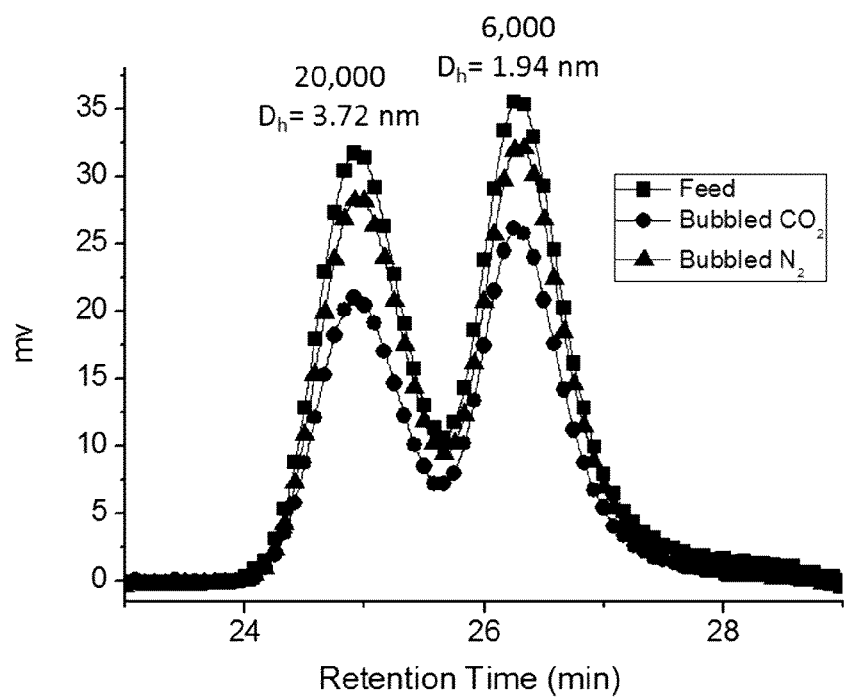

The filtration of a mixture of PEGs 1,000 gr/mol and PEG 20,000 gr/mol, a mixture of PEGs 2,000 gr/mol and PEG 20,000 gr/mol, and a mixture of PEGs 6,000 gr/mol and PEG 20,000 gr/mol with membranes M3 (FIG. 14 A) to C), respectively), M2 (FIG. 15 A) to C), respectively), and M1 (FIG. 16 A) to C), respectively) was investigated by SEC. All the membranes had rejection for PEGs. Membranes, M1 and M2, with lower thicknesses, showed lower rejections for the PEGs due to smallest active materials (CNC-g-PDEAEMA) in the pathway.

The tunable rejection data for the four PEGs using the three membranes are summarized in summarized in Table 1.

TABLE 1

Rejection results for M1, M2 and M3 after passing CO$_2$ and N$_2$ by percentage

| Molecular Weight | M1 | | M2 | | M3 | |
|---|---|---|---|---|---|---|
| PEG | N$_2$ | CO$_2$ | N$_2$ | CO$_2$ | N$_2$ | Co$_2$ |
| 1,000 | 0 | 10.3 | 0 | 15.40 | 0 | 31.78 |
| 2,000 | 0 | 16.71 | 0 | 23.95 | 1 | 67.55 |
| 6,000 | 6.17 | 27.86 | 13.62 | 38.18 | 16.93 | 81.42 |
| 20,000 | 7.9 | 30.9 | 14 | 42.25 | 17.64 | 91.4 |

Figure 17:
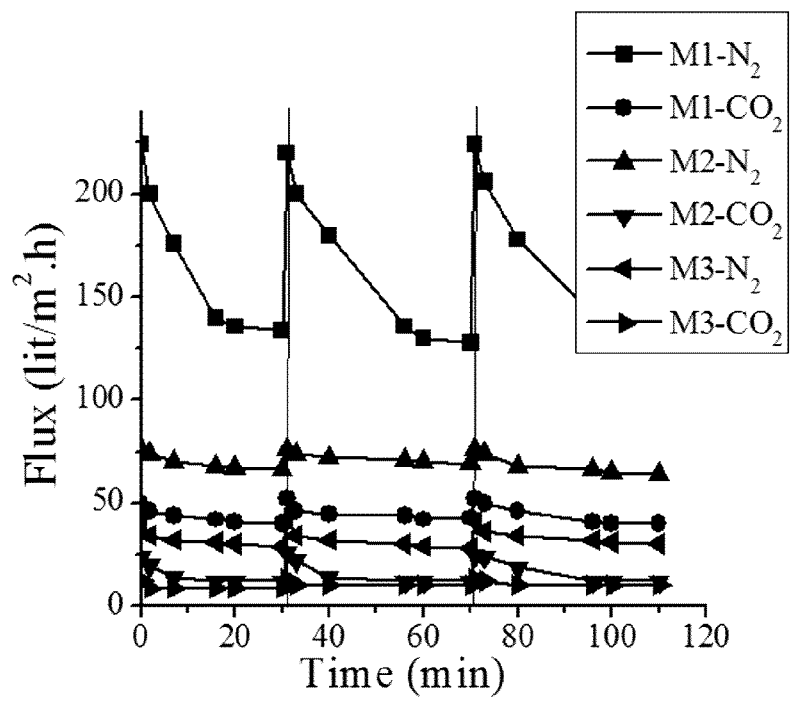
FIG. 17 shows the flux of PEG filtration for three $CO_2$ and $N_2$ cycles for membranes M1, M2, and M3.

At the same time, the flux of filtration for each membrane was monitored, both under CO$_2$ and N$_2$, for three cycles, the results are shown in FIG. 17. Interestingly, the membranes are able to recover their initial flux after washing with pure water for 30 min and bubbling N$_2$, because the membrane gates are open and the residual species in the pores can be washed away. This is an advantageous property of these membranes: to recover their water flux by washing with pure water. It shows that, by opening the pores, contaminants can be removed from the membranes.

Thus, the membranes are reusable, and they can be used for several times after washing with pure water.

BSA and Rhodamine B

The active material in our membrane have static charge on their surfaces which influences the filtration. Thus, we tested charged materials: BSA and Rhodamine B. BSA is a protein which has different static charge in different pH due to carboxylic acid and amine groups on its surface. However, Rhodamine B has a constant positive static charge even at different pHs.

Figure 18:
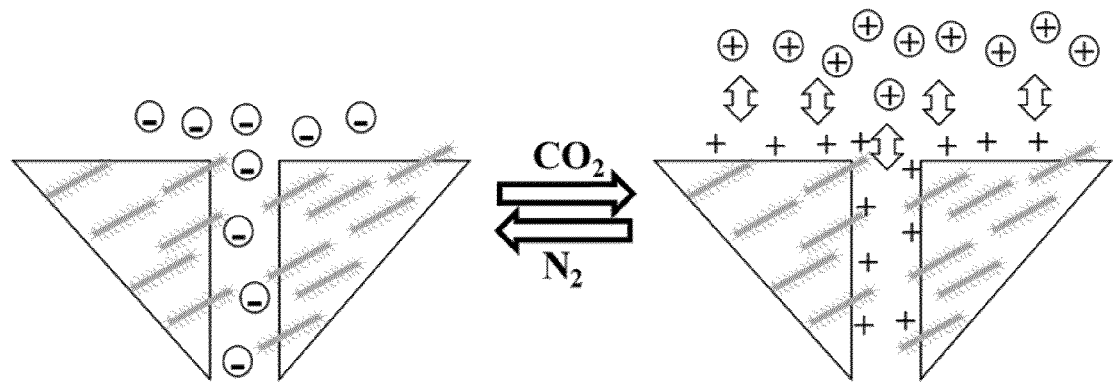
FIG. 18 is a schematic representation of the mechanism of filtration for BSA.

BSA was selected as model protein to study its interaction with CNC-g-PDEAEMA. Due to positively charged state of PDEAEMA in response to CO$_2$, the BSA (isoelectric point=4.8), also positively charged at pH=4.5 (solution under CO$_2$), exhibited electrostatic repulsion with the polymer, which helped to increase the rejection of the protein, i.e., favored protein separation. However, after bubbling N$_2$, at PH=7, BSA exhibited a negative charge and PDEAEMA was neutral, so the rejection decreased. This phenomenon is shown at FIG. 18.

Figure 19:
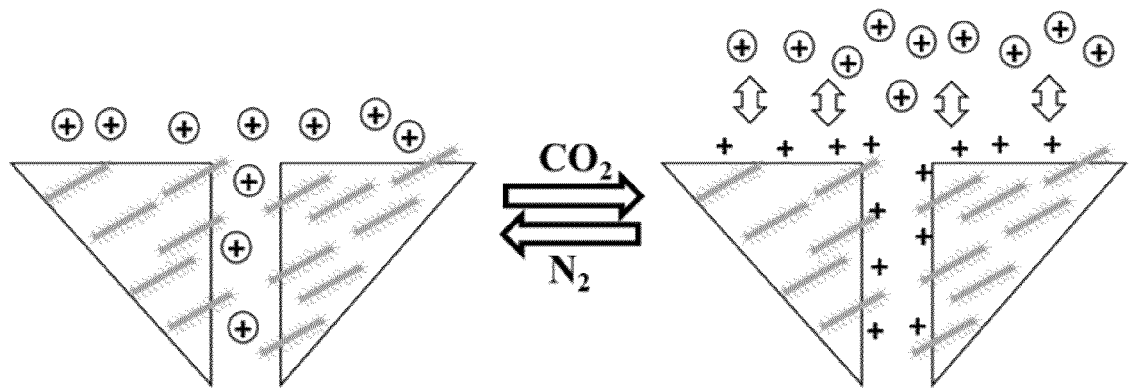
FIG. 19 is a schematic representation of the mechanism of filtration Rhodamine B.

Rhodamine B was used as a model of positively charged dye. As positive dye was electrostatically repulsed by positively charged PDEAEMA, which helped dye rejection. In its positively charged state, PDEAEMA repulsed Rhodamine B, allowing the flux to remain relatively constant, similar to the test with BSA. When PDEAEMA was neutral, Rhodamine B was still positively charged, and a drop of the flux at the starting of the experiment showed that the membranes were contaminated by the dye molecules. This was possibly because there were negatively charged sulfonate groups (produced by acid sulfuric hydrolysis to produce the CNC) on the surface of CNC and that these groups could adsorb Rhodamine B molecules—see FIG. 19.

Figure 20:
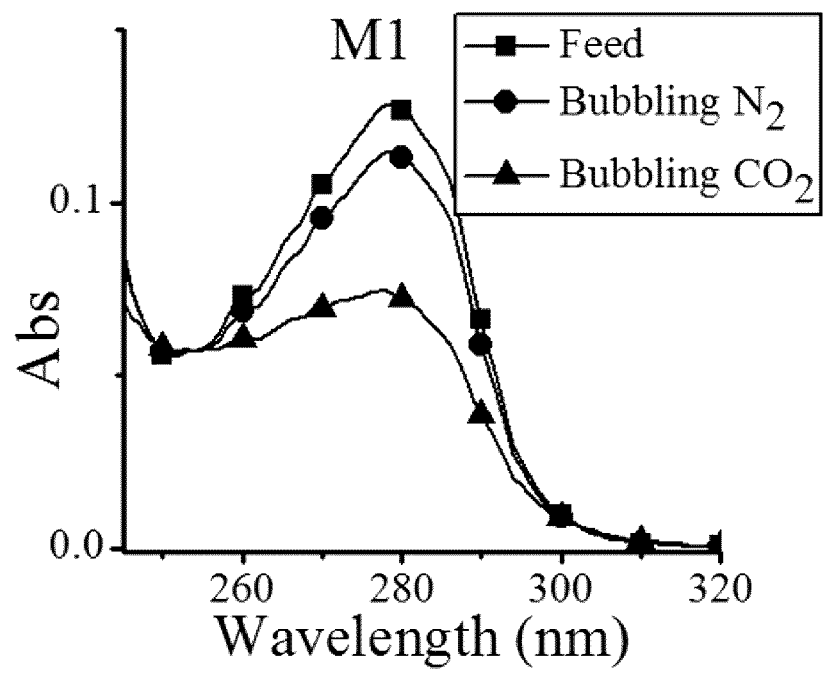
FIG. 20 A) shows UV-Vis absorption spectra of the feed for BSA filtration, the permeate after filtration M1 with bubbling $CO_2$, and the permeate after filtration M1 with $N_2$.
Figure 20:
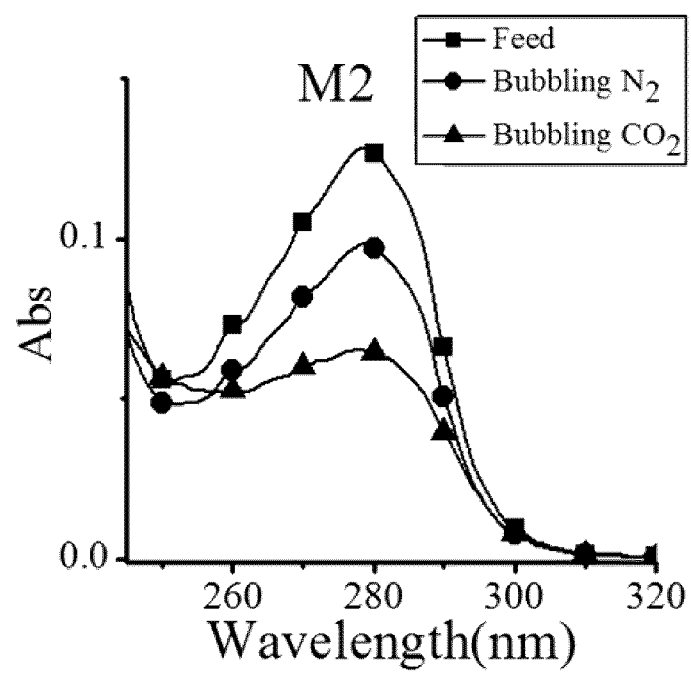
Figure 20:
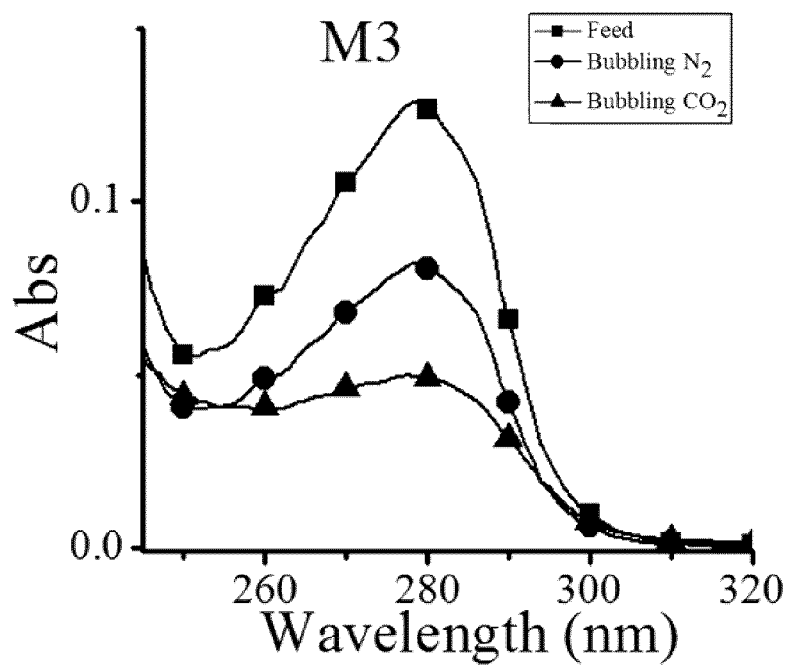

The UV-Vis absorbance spectra of for the BSA feed solution, the permeate filtered under CO$_2$ and the permeate filtered under N$_2$ are shown in FIG. 20. More specifically, FIGS. 20 A), B), and C) show the concentration of BSA in the solutions filtered by membranes M1, M2 and M3, respectively. By increasing the thickness of membrane from M1 to M3, the rejection gap decreased due to the reduced pore size of M3.

Figure 21:
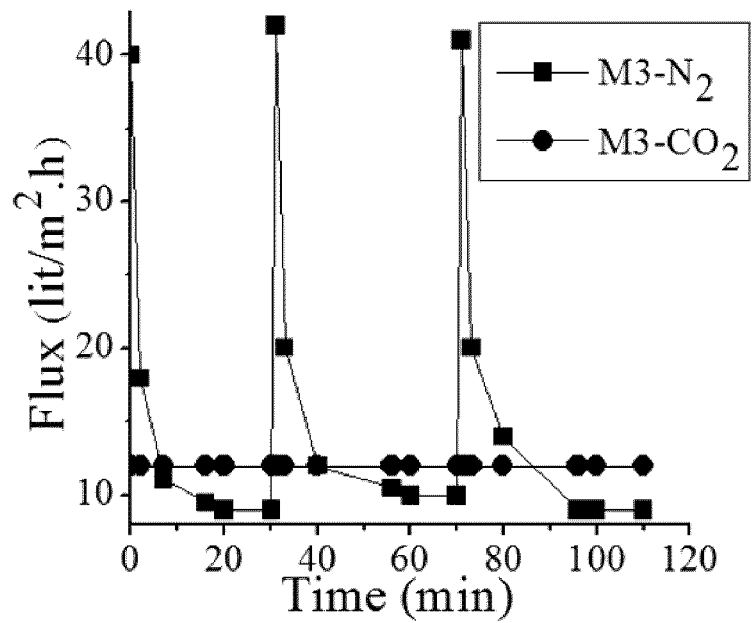
FIG. 21 shows the flux filtration of BSA by M3 after bubbling $CO_2$ and $N_2$ in three cycles after recovering.
Figure 22:
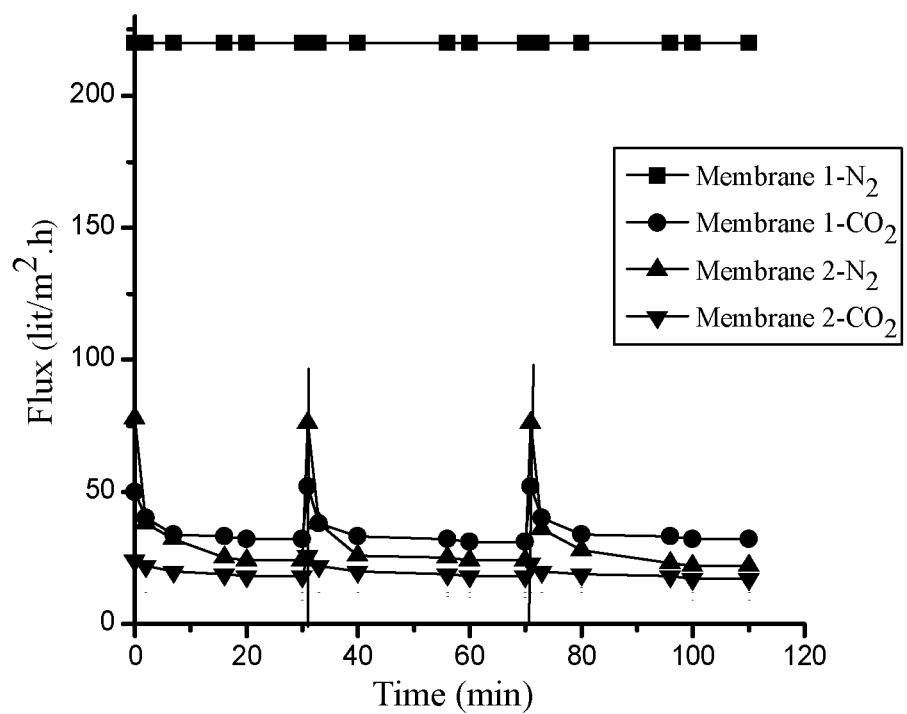
FIG. 22 shows the flux filtration of BSA by M1 and M2 after bubbling $CO_2$ and $N_2$ in three cycles after recovering.

FIG. 21 shows the protein solution flux for membrane M3 after bubbling CO$_2$ and N$_2$ in three cycles, after recovering by washing with pure water. Due to repulsion between BSA and membranes under CO$_2$, the flux did not change significantly. As BSA molecules are repulsed by the charged PDEAEMA, they make a cake layer and do not block the pores of the membrane. This phenomenon was observed with M3 whose flux, after N$_2$, was reduced to below that under CO$_2$. On the other hand, the flux of M1 did not change because its pore size is bigger than BSA molecules for having interactions—see FIG. 22. For recovering the membranes, M1 easily can be washed by pure water to recover its flux, but M2 and M3 needs to be washed by pure water with one cycle of passing CO$_2$ and N$_2$ before they exhibited their initial flux again. The reason for one-time bubbling CO$_2$ is the positive charge of PDEAEMA which repulsed the positive charged BSA. So, the BSA were removed from the membranes and the water flux came back to initial state. The removal of contaminations is a significant advantage of the membranes because it allows their reuse. We used the membranes for three cycles to filter BSA.

Figure 23:
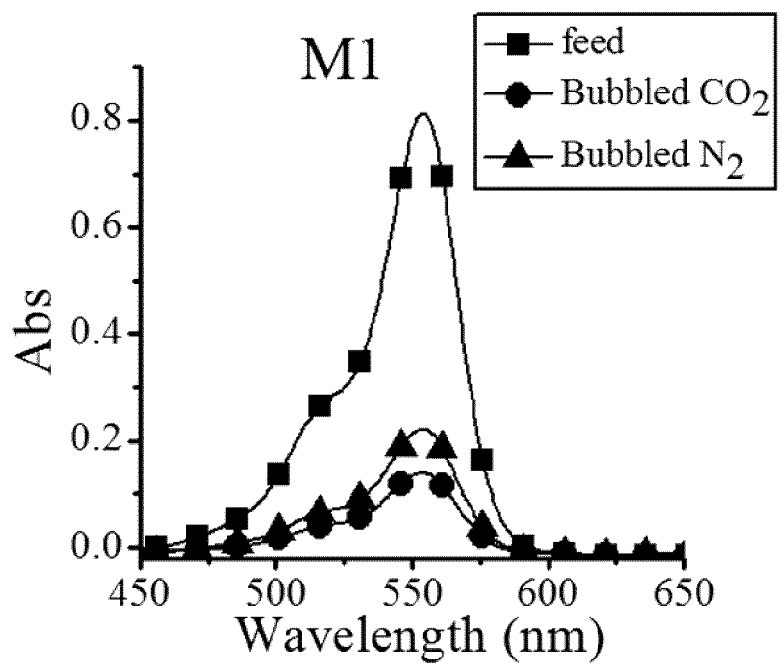
FIG. 23 A) shows UV-Vis absorption spectra of the feed for Rhodamine B filtration, the permeate after filtration M1 with bubbling $CO_2$, and the permeate after filtration M1 with $N_2$.
Figure 23:
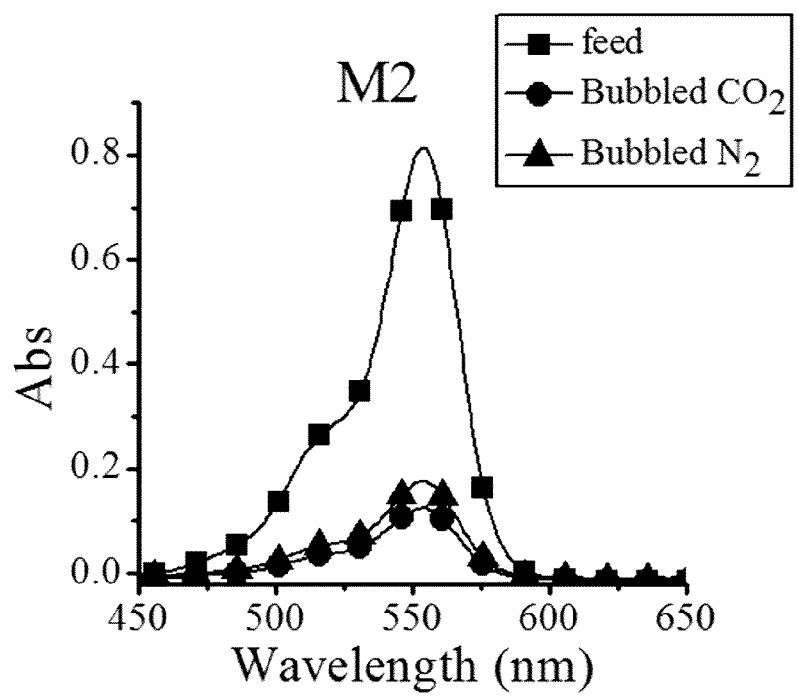
Figure 23:
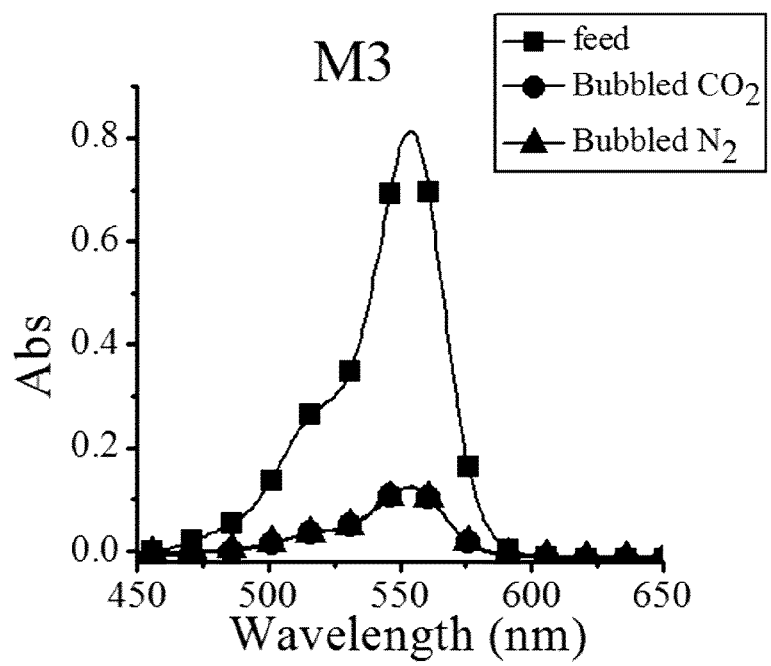

The UV-Vis spectra presented in FIG. 23 show the concentration change of Rhodamine B in the feed solution and in the permeate after filtration with CO$_2$ and N$_2$ passing through membranes M1, M2, and M3. The results obtained with the three membranes show gas tunability of the dye rejection (based on the concentration of Rhodamine B in the permeate solutions).

Figure 24:
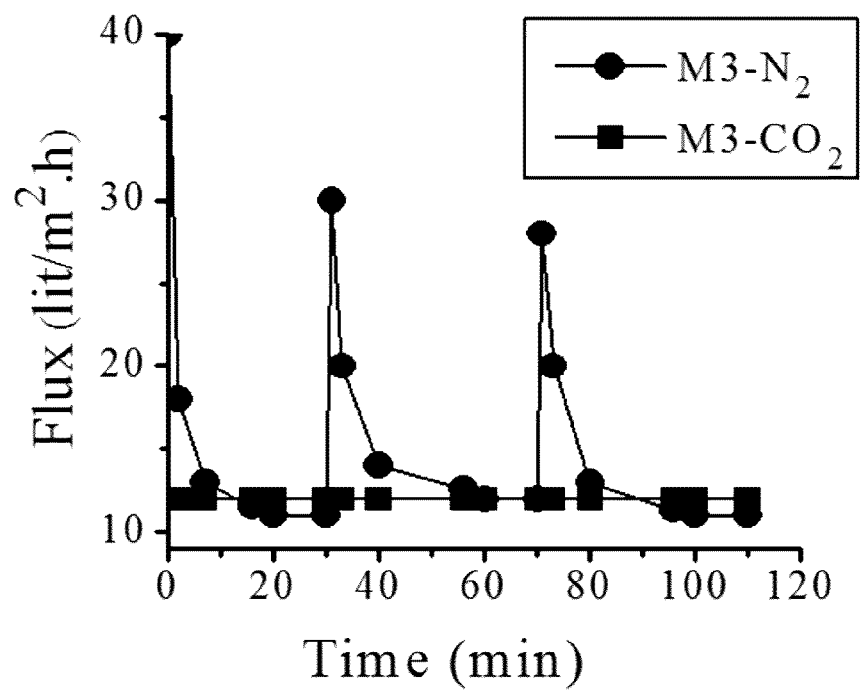
FIG. 24 shows the flux filtration of Rhodamine B by M3 after bubbling $CO_2$ and $N_2$ in three cycles after recovering.
Figure 25:
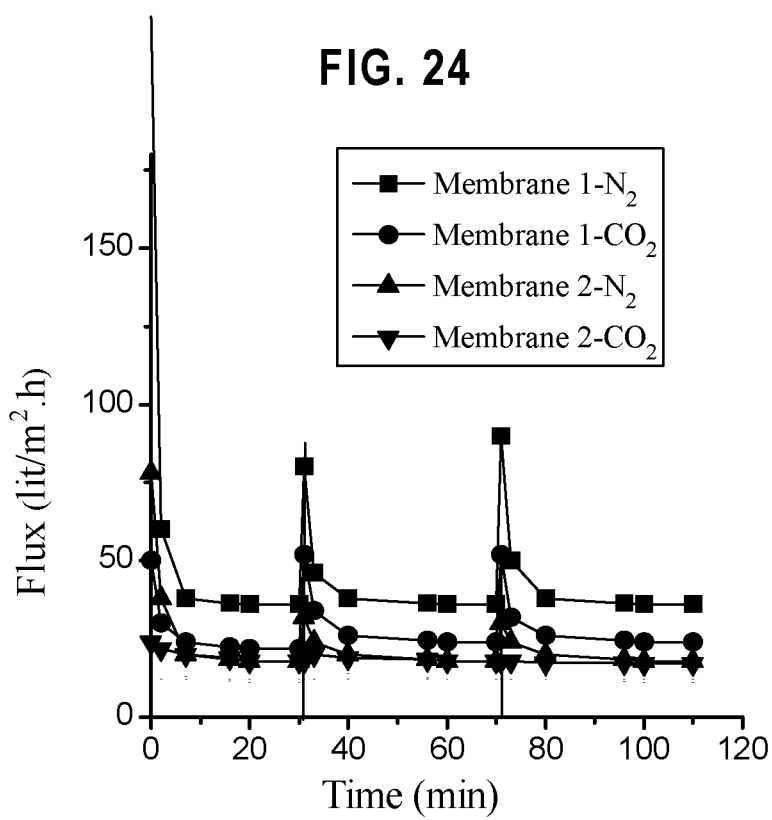
FIG. 25 shows the filtration of Rhodamine B by M1 and M2 after bubbling $CO_2$ and $N_2$ in three cycles after recovering.

The flux test of Rhodamine B filtration showed that the membranes were contaminated in the neutral state while the flux did not experience significant change for M1 and M2 and no change for M3 in the charged state—see FIGS. 24 and 25. The membranes, in the neutral state, had high contamination and the flux significantly dropped in the filtration process.

Overall, the results showed that the charged molecules, like BSA and Rhodamine B, experience electrostatic repulsion interactions with charged PDEAEMA, which enhances the rejection performance of the membrane under CO$_2$ stimulation. The rejection of BSA and Rhodamine B are summarized in Table 2. Table 2: Rejection results for BSA and Rhodamine B for M1, M2 and M3 after bubbling $CO_2$ and $N_2$

|  | M1 | | M2 | | M3 | |
|---|---|---|---|---|---|---|
| Compounds | $N_2$ | $CO_2$ | $N_2$ | $CO_2$ | $N_2$ | $CO_2$ |
| BSA-Protein | 10.94 | 42.19 | 22.2 | 49.93 | 35.94 | 61.1 |
| Rhodamine B | 73.01 | 82.84 | 79 | 83.96 | 85.06 | 85.06 |

Conclusion

CNC-based, gas-tunable membranes for ultrafiltration were successfully prepared for the first time, using a very easy and reproducible method: vacuum-assisted filtration. Three membranes with different thicknesses were fabricated. The membranes could reversibly be tuned from an open gate configuration to a closed gate configuration using $N_2$ and $CO_2$ stimulation, respectively, and they were capable of separating mixtures of PEGs of different molecular weights with hydrodynamic diameters ranging from 0.7 to 3.7 nm. In other words, they allowed precise UF involving very small pore sizes in the order of a few nanometers. Moreover, the gas-sensitive charge of the PDEAEMA grafted on the CNC surface could be used for gas-tunable rejection of charged proteins like BSA and charged dyes like Rhodamine B.

Example 2—Pressure Resistance

A quick test was carried out to test the pressure resistance of the membranes of Example 1. Membrane M3 was used to filter water under 4 bars of pressure, rather than 2 bars as in Example 1. The membrane resisted this increased pressure and conserved its structure integrity.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

Arredondo et al. Synthesis of $CO_2$-responsive cellulose nanocrystals by surface-initiated Cu(O)-mediated polymerisation, Green Chem., 2017, 19, 4141-4152
Bernardinelli et al. Quantitative 13C MultiCP Solid-State NMR as a Tool for Evaluation of Cellulose Crystallinity Index Measured Directly inside Sugarcane Biomass. Biotechnol. Biofuels 2015, 8 (1), 110.
Carpenter et al. Cellulose Nanomaterials in Water Treatment Technologies. Environ. Sci. Technol. 2015, 49 (9), 5277-5287.
Cheng et al. Facile Fabrication of Superhydrophilic Membranes Consisted of Fibrous Tunicate Cellulose Nanocrystals for Highly Efficient Oil/Water Separation. J. Memb. Sci. 2017, 525, 1-8.
Dong et al. CO2-Responsive Polymer Membranes with Gas-Tunable Pore Size. Chem. Commun. 2017, 53 (69), 9574-9577.
Fielding et al. Synthesis of PH-Responsive Tertiary Amine Methacrylate Polymer Brushes and Their Response to Acidic Vapour. J. Mater. Chem. 2011, 21 (32), 11773-11780.
Freeman et al. Materials Science of Membranes for Gas and Vapor Separation; 2006.
Garcia-Valdez et al. Grafting $CO_2$-responsive polymers from cellulose nanocrystals vianitroxide-mediated polymerisation, Polym. Chem., 2017, 8, 4124-4131,
Glasing et al. Graft-modified cellulose nanocrystals as $CO_2$-switchable Pickering emulsifiers, Polym. Chem., 2018, 9, 3864-3872.
Glasing et al. Grafting well-defined CO2-responsive polymers to cellulose nanocrystals via nitroxide-mediated polymerisation: effect of graft density and molecular weight on dispersion behaviour, Polym. Chem., 2017, 8, 6000-6012
Guo et al. A Novel Smart Polymer Responsive to CO2. Chem. Commun. 2011, 47 (33), 9348-9350.
Habibi et al. Cellulose Nanocrystals: Chemistry, Self-Assembly, and Applications. Chem. Rev. 2010, 110 (6), 3479-3500.
Han et al. General Strategy for Making CO2-Switchable Polymers, ACS Macro Lett. 2012, 1, 1, 57-61
He et al. Diffusion and Filtration Properties of Self-Assembled Gold Nanocrystal Membranes. Nano Lett. 2011, 11 (6), 2430-2435.
Hilal et al. Characterization and Retention of NF Membranes Using PEG, HS and Polyelectrolytes. Desalination 2008, 221 (1), 284-293.
Holt et al. Fast Mass Transport Through Sub-2-Nanometer Carbon Nanotubes. Science (80). 2006, 312 (5776), 1034 LP-1037.
Huang et al. Ultrafast Viscous Water Flow through Nanostrand-Channeled Graphene Oxide Membranes. Nat. Commun. 2013, 4, 2979.
J. Mulder. Basic Principles of Membrane Technology; 2012.
Johnson et al. Quantitative Solid-State 13C NMR with Signal Enhancement by Multiple Cross Polarization. J. Magn. Reson. 2014, 239, 44-49.
Li et al. A Novel Ultrafiltration (UF) Membrane with Controllable Selectivity for Protein Separation. J. Memb. Sci. 2013, 427, 155-167.
Liu et al. CO2-Responsive polymer materials, Polym. Chem., 2017, 8, 12
Liu et al. Stimuli-Responsive Smart Gating Membranes. Chem. Soc. Rev. 2016, 45 (3), 460-475.
Merkel et al. Ultrapermeable, Reverse-Selective Nanocomposite Membranes. Science (80-.). 2002, 296 (5567), 519 LP-522.
Morandi et al. Cellulose Nanocrystals Grafted with Polystyrene Chains through Surface-Initiated Atom Transfer Radical Polymerization (SI-ATRP), Langmuir 2009, 25 (14), 8280-8286.
Motornov et al. Chemical Gating with Nanostructured Responsive Polymer Brushes: Mixed Brush versus Homopolymer Brush. ACS Nano 2008, 2 (1), 41-52.
Park et al. Measuring the Crystallinity Index of Cellulose by Solid State 13C Nuclear Magnetic Resonance. Cellulose 2009, 16 (4), 641-647.
Platt et al. etention of Pegs in Cross-Flow Ultrafiltration through Membranes. Desalination 2002, 149 (1), 417-422.
Scott, Handbook of Industrial Membranes; 1995.
Sui et al. Synthesis of Cellulose-Graft-Poly(N,N-Dimethylamino-2-Ethyl Methacrylate) Copolymers via Homogeneous ATRP and Their Aggregates in Aqueous Media. Biomacromolecules 2008, 9 (10), 2615-2620.
Wang et al. Cellulose nanocrystals with CO2-switchable aggregation and redispersion properties, Cellulose (2015) 22:3105-3116

Ye et al. Scaling Laws between the Hydrodynamic Parameters and Molecular Weight of Linear Poly(2-Ethyl-2-Oxazoline). RSC Adv. 2013, 3 (35), 15108-15113.

The invention claimed is:

1. An ultrafiltration/nanofiltration membrane with gas-tunable pore size comprising an active layer, wherein the active layer is formed of a porous polyether sulfone (PES), cellulose acetate, Nylon, cellulose nitrate, or polytetrafluoroethylene (PTFE) membrane and wherein chains of $CO_2$-responsive polymer are grafted on the surface and the gates of the membrane.

2. An ultrafiltration/nanofiltration membrane with gas-tunable pore size comprising an active layer arranged on a first porous support layer,
wherein the active layer is formed of randomly arranged cellulose nanocrystals,
wherein pores are defined in the active layer by the free spaces existing between the randomly arranged cellulose nanocrystals, and
wherein chains of a $CO_2$-responsive polymer are grafted on the surface of the cellulose nanocrystals.

3. The membrane of claim 1, wherein the cellulose nanocrystals are covalently bonded to the first porous support layer.

4. The membrane of claim 2, wherein the cellulose nanocrystals are covalently bonded to each other.

5. The membrane of claim 2, wherein upon exposure of the membrane to $CO_2$, the chains of the $CO_2$-responsive polymer either extend away from the surface of the cellulose nanocrystals, thereby decreasing the size of the pores in the active layer, or collapse on themselves close to the surface of the cellulose nanocrystals, thereby increasing the size of the pores in the active layer, and
wherein exposure of the membrane to an inert gas reverses the changes caused by exposure to $CO_2$.

6. The membrane of claim 2, wherein the $CO_2$-responsive polymer bears $CO_2$-sensitive functional groups which are organobase functional groups or weak-acid carboxyl functional groups.

7. The membrane of claim 2, wherein the $CO_2$-responsive polymer is:
poly[(2-dimethylamino) ethyl methacrylate] (PDMAEMA),
poly(2-(diethylamino)ethyl methacrylate) (PDEAEMA),
poly(3-N',N'-dimethylaminopropyl acrylamide) (PDMAPMA),
poly(N-methyltetrahydropyrimidine) (PMTHP),
poly(p-azidomethylstyrene-co-styrene),
poly[2-methyl-1-(4-vinylbenzyl)-1,4,5,6-tetrahydropyrimidine],
poly(dimethyl acrylamide-co-(N-amidino)ethyl acrylamide) (P(DMA-co-NAEAA)), or
poly(ethylene oxide)-b-poly((N-amidino)dodecyl acrylamide).

8. The membrane of claim 2, wherein when the membrane is exposed to $CO_2$, the chains of the $CO_2$-responsive polymer extend away from the surface of the cellulose nanocrystals, thereby decreasing the size of the pores in the active layer, and
when the membrane is exposed to an inert gas, the chains of the $CO_2$-responsive polymer collapse on themselves close to the surface of the cellulose nanocrystals, thereby increasing the size of the pores in the active layer.

9. The membrane of claim 2, having a charge tunability between neutral and positive or between negative and increasingly neutral.

10. A method of filtering a feed using the membrane of claim 2, the method comprising the step of contacting the feed with one side of the membrane and applying pressure to the feed so that materials to be separated from the feed pass through the membrane as a permeate.

11. The method of claim 10, further comprising, the step of tuning the apparent pore size, the molecular weight cut-off (MWCO), the charge, the hydrophilicity, and/or the flowrate of the membrane by contacting the membrane with $CO_2$ or an inert gas.

12. The method of claim 10, further comprising the step of cleaning the membrane.

13. The method of claim 12, wherein the cleaning step comprises the step of contacting the membrane with $CO_2$ or an inert gas to:
increase the apparent pore size of the membrane, and/or
increase or decrease the hydrophilicity of the membrane, and/or
dislodge matter clogging the membrane by extending the $CO_2$-responsive polymer chains away from the surface of the cellulose nanocrystals or collapse the $CO_2$-responsive polymer chains on themselves close to the surface of the cellulose nanocrystals.

14. The method of claim 13, wherein the cleaning step further comprises the step of allowing the matter clogging the membrane to cross the membrane.

15. The method of claim 14, wherein the cleaning step further comprises the step of increasing liquid flow across the membrane to ease passage of the matter clogging the membrane across the membrane.

16. The method of claim 12, wherein filtering of the feed continues during the cleaning step.

17. The method of claim 13, wherein the cleaning step further comprises the steps of reversing the liquid flow across the membrane and allowing the matter clogging the membrane to flow back out of the membrane.

18. The method of claim 12, wherein the cleaning step is carried out in situ at the location where the membrane has been used to filter the feed or will eventually be used to filter a feed.

19. A method of cleaning the membrane of claim 2 after the membrane has been used for filtering a feed or while the membrane is being used for filtering a feed, the method comprises the step of contacting the membrane with $CO_2$ or an inert gas to:
increase the apparent pore size of the membrane, preferably to a maximum pore size, and/or
increase or decrease the hydrophilicity of the membrane, and/or
dislodge matter clogging the membrane by extending the $CO_2$-responsive polymer chains away from the surface of the cellulose nanocrystals or collapse the $CO_2$-responsive polymer chains on themselves close to the surface of the cellulose nanocrystals.

* * * * *